United States Patent
Wakabayashi et al.

(10) Patent No.: US 9,670,374 B2
(45) Date of Patent: Jun. 6, 2017

(54) WATER-BASED INK FOR INKJET PRINTING

(71) Applicant: KAO CORPORATION, Tokyo (JP)

(72) Inventors: Yuki Wakabayashi, Izumiotsu (JP); Hirotaka Takeno, Wakayama (JP); Daiki Kawata, Wakayama (JP)

(73) Assignee: KAO CORPORATION, Tokyo (JP)

(*) Notice: Subject to any disclaimer, the term of this patent is extended or adjusted under 35 U.S.C. 154(b) by 0 days.

(21) Appl. No.: 15/106,965

(22) PCT Filed: Dec. 18, 2014

(86) PCT No.: PCT/JP2014/083581
§ 371 (c)(1),
(2) Date: Jun. 21, 2016

(87) PCT Pub. No.: WO2015/098701
PCT Pub. Date: Jul. 2, 2015

(65) Prior Publication Data
US 2017/0037268 A1    Feb. 9, 2017

(30) Foreign Application Priority Data

Dec. 25, 2013  (JP) .................................. 2013-267036

(51) Int. Cl.
| | | |
|---|---|---|
| *G01D 11/00* | (2006.01) | |
| *C09D 11/36* | (2014.01) | |
| *C09D 11/322* | (2014.01) | |
| *B41J 2/01* | (2006.01) | |

(52) U.S. Cl.
CPC .................. *C09D 11/36* (2013.01); *B41J 2/01* (2013.01); *C09D 11/322* (2013.01)

(58) Field of Classification Search
CPC ....... C09D 11/322; C09D 11/40; C09D 11/30; C09D 11/326; C09D 11/32; C09D 11/328; C09D 17/001; C09D 17/003; B41M 5/0023; B41J 2/2107; B41J 2/01
USPC .......................... 347/21, 100; 106/31.13, 31.6
See application file for complete search history.

(56) References Cited

U.S. PATENT DOCUMENTS

| | | | | |
|---|---|---|---|---|
| 2006/0052480 A1* | 3/2006 | Mizushima | ............ | C09D 11/32 523/160 |
| 2007/0213428 A1* | 9/2007 | Hiraishi | ............... | C09D 11/322 523/160 |
| 2013/0065028 A1 | 3/2013 | Fujii et al. | | |
| 2013/0215175 A1 | 8/2013 | Ozawa | | |

FOREIGN PATENT DOCUMENTS

| | | |
|---|---|---|
| JP | 2003-82264 A | 3/2003 |
| JP | 2012-171216 A | 9/2012 |
| JP | 2013-76062 A | 4/2013 |
| JP | 2013-107951 A | 6/2013 |
| JP | 2013-199634 A | 10/2013 |
| JP | 2014-173078 A | 9/2014 |

OTHER PUBLICATIONS

International Search Report, issued in PCT/JP2014/083581, dated Mar. 31, 2015.
Safety Data Sheet (1,3-dimethyl-2-imidazolidinone) cited in Non Final Office Action, dated May 9, 2016 (mailing date: May 17, 2016) in the corresponding Japanese Application No. 2013-267036.

\* cited by examiner

*Primary Examiner* — Jannelle M Lebron
(74) *Attorney, Agent, or Firm* — Birch, Stewart, Kolasch & Birch, LLP

(57) ABSTRACT

The present invention provides a water-based ink for ink-jet printing which is excellent in ejection stability and storage stability, in particular, excellent in quick-drying fixing properties and image uniformity when printing characters or images on a low-water absorbing recording medium, and an image forming method using the water-based ink. The present invention relates to [1] a water-based ink for ink-jet printing, including a pigment, a water-insoluble polymer, an organic solvent (C) and water, in which the organic solvent (C) includes diethylene glycol isopropyl ether (DEGPE) and an organic solvent (c2) having a 1-octanol/water partition coefficient that is smaller than that of DEGPE; a total content of the pigment, the water-insoluble polymer and DEGPE in the water-based ink is not less than 5.0% by mass; and a value obtained by multiplying a total content of the pigment and the water-insoluble polymer in the water-based ink by a content of DEGPE in the water-based ink is from 10 and 300; and [2] an image forming method including the steps of mounting a container filled with the water-based ink to an ink-jet printing apparatus equipped with an ink ejecting means; and ejecting the ink onto a recording medium having a water absorption of from 0 to 10 g/m$^2$ as measured by contacting with pure water for 100 ms to print characters or images thereon.

19 Claims, No Drawings

WATER-BASED INK FOR INKJET PRINTING

FIELD OF THE INVENTION

The present invention relates to a water-based ink for ink-jet printing, and an image forming method using the water-based ink.

BACKGROUND OF THE INVENTION

In ink-jet printing methods, droplets of ink are directly projected onto a recording medium from very fine nozzles and allowed to adhere to the recording medium to form characters or images. The ink-jet printing methods have become rapidly spread because of various advantages such as easiness of full coloration, low cost, capability of using a plain paper as the recording medium, non-contact with printed characters or images, etc.

In recent years, in order to impart good weathering resistance and good water resistance to printed materials, an ink containing a pigment as a colorant has been extensively used.

On the other hand, it has been required to print characters or images on recording media for commercial printing purposes using a low-liquid absorbing coated paper such as an offset coated paper, or a non-liquid absorbing resin film such as a polyvinyl chloride resin film, a polypropylene resin film and a polyester resin film.

It is known that when characters or images are printed on the low-liquid absorbing or non-liquid absorbing recording media by the ink-jet printing methods, there tend to occur problems such as prolonged drying time owing to slow absorption or no absorption of liquid components, and deterioration in quick-drying fixing properties of the ink and image uniformity upon printing the characters or images, etc., thereon.

JP 2013-107951A discloses an aqueous pigment ink set constituted of a magenta ink, a cyan ink, a yellow ink and a black ink, in which the respective inks include at least water, a solvent and a pigment, and the pigment includes a specific pigment. In JP 2013-107951A, it is described that the ink set is excellent in effects of suppressing strike-through of the ink when printed on an offset-printing wood-free paper and preventing occurrence of color unevenness of printed characters or images on a coated paper.

JP 2003-82264 A discloses an aqueous pigment ink for ink-jet printing which includes carbon black and/or an organic pigment, glycerol, triethylene glycol monobutyl ether and a specific glycol-based ether. In JP 2003-82264A, it is described that the ink is free from separation of triethylene glycol monobutyl ether from the pigment component and glycerol even when water contained in the ink is completely evaporated therefrom, hardly suffers from formation of aggregated products, and is excellent in ejection properties and can be prevented from occurrence of clogging of the ink at a tip end of an ink-jet print head even when used for ink-jet printing.

SUMMARY OF THE INVENTION

The present invention relates to the following aspects [1] and [2].
[1] A water-based ink for ink-jet printing, including a pigment (A), a water-insoluble polymer (B), an organic solvent (C) and water, in which the organic solvent (C) includes diethylene glycol isopropyl ether (c1) and an organic solvent (c2) having a 1-octanol/water partition coefficient that is smaller than that of the diethylene glycol isopropyl ether (c1); a total content of the pigment (A), the water-insoluble polymer (B) and the diethylene glycol isopropyl ether (c1) in the water-based ink is not less than 5.0% by mass; and a value obtained by multiplying a total content (% by mass) of the pigment (A) and the water-insoluble polymer (B) in the water-based ink by a content (% by mass) of the diethylene glycol isopropyl ether (c1) in the water-based ink is not less than 10 and not more than 300.
[2] An image forming method including the steps of:
mounting a container filled with the water-based ink according to the above aspect [1] to an ink-jet printing apparatus equipped with an ink ejecting means; and
ejecting the ink onto a recording medium having a water absorption of not less than 0 g/m$^2$ and not more than 10 g/m$^2$ as measured by contacting with pure water for 100 ms to print characters or images thereon.

Solution to Problem

In the technology described in JP 2013-107951A, there tends to occur such a problem that the ink is insufficient in ejection stability from an ink-jet print head as well as storage stability, whereas in the technology described in JP 2003-82264A, there tends to occur such a problem that the ink is insufficient in ejection stability when the ink is compounded with a polymer for dispersing a pigment therein.

The present invention relates to a water-based ink for ink-jet printing which is excellent in ejection stability and storage stability, in particular, excellent in quick-drying fixing properties and image uniformity when printing characters or images on a low-water absorbing recording medium, and an image forming method using the water-based ink.

Meanwhile, the term "low water absorption" as used in the present invention is intended to mean both concepts of low water absorption and non-water absorption.

The present inventors have noticed an organic solvent acting as a humectant in a water-based ink including a pigment, a water-insoluble polymer, an organic solvent and water, and have found that when using diethylene glycol isopropyl ether in combination with an organic solvent (c2) having a 1-octanol/water partition coefficient that is smaller than that of the diethylene glycol isopropyl ether and suitably adjusting amounts of these components to be compounded, it is possible to obtain a water-based ink for ink-jet printing which is excellent in ejection stability and storage stability, in particular, excellent in quick-drying fixing properties and image uniformity when printing characters or images on a low-water absorbing recording medium.

That is, the present invention relates to the following aspects [1] and [2].
[1] A water-based ink for ink-jet printing, including a pigment (A), a water-insoluble polymer (B), an organic solvent (C) and water, in which the organic solvent (C) includes diethylene glycol isopropyl ether (c1) and an organic solvent (c2) having a 1-octanol/water partition coefficient that is smaller than that of the diethylene glycol isopropyl ether (c1); a total content of the pigment (A), the water-insoluble polymer (B) and the diethylene glycol isopropyl ether (c1) in the water-based ink is not less than 5.0% by mass; and a value obtained by multiplying a total content (% by mass) of the pigment (A) and the water-insoluble polymer (B) in the water-based ink by a content (% by mass) of the diethylene glycol isopropyl ether (c1) in the water-based ink is not less than 10 and not more than 300.

[2] An image forming method including the steps of;
mounting a container filled with the water-based ink according to the above aspect [1] to an ink-jet printing apparatus equipped with an ink ejecting means; and
ejecting the ink onto a recording medium having a water absorption of not less than 0 g/m² and not more than 10 g/m² as measured by contacting with pure water for 100 ms to print characters or images thereon.

In accordance with the present invention, there are provided a water-based ink for ink-jet printing which is excellent in ejection stability and storage stability, in particular, excellent in quick-drying fixing properties and image uniformity when printing characters or images on a low-water absorbing recording medium, and an image forming method using the water-based ink.

DESCRIPTION OF EMBODIMENTS

Water-Based Ink for Ink-Jet Printing

The water-based ink for ink-jet printing according to the present invention includes a pigment (A), a water-insoluble polymer (B), an organic solvent (C) and water,
in which the organic solvent (C) includes diethylene glycol isopropyl ether (c1) and an organic solvent (c2) having a 1-octanol/water partition coefficient that is smaller than that of the diethylene glycol isopropyl ether (c1);
a total content of the pigment (A), the water-insoluble polymer (B) and the diethylene glycol isopropyl ether (c1) in the water-based ink is not less than 5.0% by mass; and
a value obtained by multiplying a total content (% by mass) of the pigment (A) and the water-insoluble polymer (B) in the water-based ink by a content (% by mass) of the diethylene glycol isopropyl ether (c1) in the water-based ink is not less than 10 and not more than 300.

The water-based ink for ink-jet printing according to the present invention is excellent in ejection stability and storage stability, and can also exhibit excellent quick-drying fixing properties and image uniformity when printing characters or images on a low-water absorbing recording medium. The reason therefor is considered as follows though it is not clearly determined.

That is, the pigment or the polymer as a dispersant which is contained in the water-based ink remaining within an ink-jet print head after the ink-jet printing is concentrated by evaporation of water therefrom. The diethylene glycol isopropyl ether (c1) (hereinafter also referred to as "DEGPE") contained in the water-based ink according to the present invention has a less interaction with the pigment (A) or the water-insoluble polymer (B). Therefore, it is considered that the pigment (A) can be prevented from being aggregated together by reduction in electric potential on the surface of the pigment (A) which is caused by increase in counter ion coulomb force between a cation and an anion existing on the surface of the pigment (A) which has an influence on static repulsion of the pigment, and further the increase in viscosity of the water-based ink which is caused by increase in volume fraction of the water-insoluble polymer (B) owing to swelling thereof can be suppressed, as well as the increase in viscosity of the water-based ink can also be suppressed owing to low viscosity of DEGPE itself. In addition, it is considered that by adding the organic solvent (c2) having a 1-octanol/water partition coefficient that is smaller than that of DEGPE to the water-based ink, it is possible to allow the pigment (A) and the water-insoluble polymer (B) to be more stably present in the water-based ink, and therefore suppress occurrence of ejection defects and deterioration in storage stability of the water-based ink owing to increase in viscosity of the water-based ink.

Furthermore, it is considered that when printing characters or images on a recording medium, in particular, on a low-water absorbing recording medium, using the water-based ink according to the present invention, the pigment (A) is dispersed by the water-insoluble polymer (B) to thereby cause spreading of a dot size of the ink, whereas since DEGPE contained in the organic solvent (C) has a relatively low boiling point, the water-based ink is excellent in drying properties, and the obtained printed characters or images are excellent in image uniformity without bleeding, etc.

In addition, in the present invention, the total content of the pigment (A) and the water-insoluble polymer (B) as solid components and DEGPE in the water-based ink is controlled to not less than 5% by mass, and the value obtained by multiplying the total content (% by mass) of the pigment (A) and the water-insoluble polymer (B) in the water-based ink by the content (% by mass) of DEGPE in the water-based ink is controlled to the range of not less than 10 and not more than 300. The reason therefor is considered to be that when the total content of the pigment (A) and the water-insoluble polymer (B) is excessively large, the interaction between the pigment (A) and the water-insoluble polymer (B) is increased, so that aggregation of the pigment tends to be caused, whereas when the content of DEGPE is excessively large, the interaction of DEGPE with the pigment (A) and the water-insoluble polymer (B) is increased, so that the water-based ink tends to be deteriorated in stability. Also, in general, the viscosity of a dispersion system of particles such as the water-based ink is represented by the formula: $\eta=\eta_0+a\eta_0\phi$ in which $\eta_0$ is the value based on an amount of DEGPE; and $\phi$ is the value based on the pigment (A) and the water-insoluble polymer (B). Since the product of $\eta_0$ and $\phi$ is predominant in the above formula, it is considered that by controlling the value obtained by multiplying the total content (% by mass) of the pigment (A) and the water-insoluble polymer (B) by the content (% by mass) of DEGPE to the specific range, it is possible to suppress occurrence of ejection defects and deterioration in storage stability of the water-based ink.

<Water-Based Ink for Ink-Jet Printing>

The water-based ink for ink-jet printing according to the present invention (hereinafter also referred to merely as a "water-based ink" or an "ink") includes the pigment (A), the water-insoluble polymer (B), the organic solvent (C) and water.

The water-based ink according to the present invention may be obtained by mixing the pigment (A), the water-insoluble polymer (B), the organic solvent (C) and water and then stirring the resulting mixture. However, the water-based ink according to the present invention is preferably produced by the following methods (I) and (II).

Method (I): Method in which the water-based ink is obtained by mixing a water dispersion of the water-insoluble polymer (B) particles containing the pigment (A), water and the organic solvent (C), if required together with a surfactant, etc., followed by stirring the resulting mixture.

Method (II): Method in which the water-based ink is obtained by mixing a water dispersion of the water-insoluble polymer (B) particles containing the pigment (A), a water dispersion of the water-insoluble polymer (B) particles containing no pigment (A), water and the organic solvent (C), if required together with a surfactant, etc., followed by stirring the resulting mixture.

Meanwhile, the term "water-based" as used herein means that water has a largest content among whole dispersing media contained in the ink.

<Pigment (A)>

In the water-based ink according to the present invention, from the viewpoint of improving water resistance and weathering resistance of printed characters or images, the pigment (A) is used as a colorant thereof.

The pigment (A) may be either an inorganic pigment or an organic pigment and may also be used in combination with an extender pigment, if required.

Examples of the inorganic pigment include carbon blacks and metal oxides. In particular, carbon blacks are preferably used for black inks. The carbon blacks may include furnace blacks, thermal lamp blacks, acetylene blacks and channel blacks.

Specific examples of the organic pigment include azo pigments, diazo pigments, phthalocyanine pigments, quinacridone pigments, isoindolinone pigments, dioxazine pigments, perylene pigments, perinone pigments, thioindigo pigments, anthraquinone pigments, and quinophthalone pigments.

The hue of the organic pigment used in the present invention is not particularly limited, and there may be used any chromatic color pigment having a yellow color, a magenta color, a cyan color, a blue color, a red color, an orange color, a green color, etc.

Specific examples of the preferred organic pigments include one or more pigments selected from the group consisting of commercially available products marketed under the tradenames C.I. Pigment Yellow, C.I. Pigment Red, C.I. Pigment Orange, C.I. Pigment Violet, C.I. Pigment Blue and C.I. Pigment Green, etc., with various product numbers.

The pigment (A) contained in the water-based ink may be in the form of a self-dispersible pigment, a pigment dispersed with the water-insoluble polymer (B), or pigment-containing water-insoluble polymer (B) particles (refer to the aforementioned methods (I) and (II)).

Among them, from the viewpoint of improving quick-drying fixing properties of the water-based ink and image uniformity, i.e., uniformity of printed characters or images, when printed on a low-water absorbing recording medium, the pigment (A) contained in the water-based ink is preferably in the form of the water-insoluble polymer (B) particles containing the pigment (A) (hereinafter also referred to merely as "pigment-containing polymer particles").

<Water-Insoluble Polymer (B)>

The water-insoluble polymer (B) (hereinafter also referred to merely as a "component (B)") has not only a function as a pigment dispersant capable of exhibiting the effect of dispersing the pigment therein, but also a function as a fixing agent for fixing the pigment on a recording medium. Examples of the configuration of the water-insoluble polymer (B) present in the water-based ink include the configuration in which the polymer is adsorbed onto the pigment, the configuration in which the pigment is enclosed (encapsulated) in the polymer, and the configuration in which the polymer is not adsorbed onto the pigment. In the present invention, from the viewpoint of improving dispersion stability of the pigment, it is required that the water-insoluble polymer (B) is at least in the form of pigment-containing polymer particles, and is preferably present in such a configuration that the pigment is enclosed (encapsulated) in the polymer.

On the other hand, the water-insoluble polymer (B) particles containing no pigment (A) has a function as a fixing agent for fixing the pigment on a recording medium, and it is preferred that such polymer particles are present in the water-based ink.

The water-insoluble polymer (B) means both the water-insoluble polymer (B) contained in the water-insoluble polymer (B) particles containing the pigment and the water-insoluble polymer (B) contained in the water-insoluble polymer (B) particles containing no pigment.

The term "water-insoluble" in the water-insoluble polymer (B) means that the polymer has a solubility in water of not more than 10 g when the polymer is dried to constant weight at 105° C. for 2 h, and then dissolved in 100 g of water at 25° C. The solubility in water of the water-insoluble polymer (B) is preferably not more than 5 g and more preferably not more than 1 g. In the case where the water-insoluble polymer (B) is in the form of an anionic polymer, the solubility thereof means a solubility of the polymer whose anionic groups are neutralized completely (i.e., 100%) with sodium hydroxide. Also, in the case where the water-insoluble polymer (B) is in the form of a cationic polymer, the solubility thereof means a solubility of the polymer whose cationic groups are neutralized completely (i.e., 100%) with hydrochloric acid.

Examples of the water-insoluble polymer (B) used in the present invention include polyesters, polyurethanes and vinyl-based polymers. Among these polymers, preferred are vinyl-based polymers obtained by addition-polymerizing vinyl monomers (such as vinyl compounds, vinylidene compounds and vinylene compounds), from the viewpoint of improving storage stability of the resulting water-based ink.

The vinyl-based polymer used in the present invention is preferably a vinyl-based polymer that is produced by copolymerizing a monomer mixture containing (b-1) an ionic monomer (hereinafter also referred to merely as a "component (b-1)") and (b-2) a hydrophobic monomer (hereinafter also referred to merely as a "component (b-2)") (such a mixture is hereinafter also referred to merely as a "monomer mixture"). The vinyl-based polymer contains a constitutional unit derived from the component (b-1) and a constitutional unit derived from the component (b-2). It is more preferred that the vinyl-based polymer further contains a constitutional unit derived from (b-3) a macromonomer (hereinafter also referred to merely as a "component (b-3)").

[(b-1) Ionic Monomer]

The ionic monomer (b-1) is preferably used as a monomer component of the water-insoluble polymer (B) from the viewpoint of improving dispersion stability of the pigment-containing polymer particles in the ink. Examples of the ionic monomer include anionic monomers and cationic monomers. Among these monomers, preferred are anionic monomers.

Examples of the anionic monomers include carboxylic acid monomers, sulfonic acid monomers and phosphoric acid monomers.

Specific examples of the carboxylic acid monomers include acrylic acid, methacrylic acid, crotonic acid, itaconic acid, maleic acid, fumaric acid, citraconic acid and 2-methacryloyloxymethylsuccinic acid.

Among the aforementioned anionic monomers, from the viewpoint of improving dispersion stability of the pigment-containing polymer particles in the ink, preferred are the carboxylic acid monomers, and more preferred are acrylic acid and methacrylic acid.

Examples of the cationic monomers include N,N-dimethylaminoethyl methacrylate and N,N-dimethylaminoethyl acrylamide.

[(b-2) Hydrophobic Monomer]

The hydrophobic monomer (b-2) is preferably used as a monomer component of the water-insoluble polymer (B) from the viewpoint of improving dispersion stability of the pigment-containing polymer particles in the ink. Examples of the hydrophobic monomer include alkyl (meth)acrylates and aromatic group-containing monomers.

The preferred alkyl (meth)acrylates are those alkyl (meth)acrylates containing an alkyl group having 1 to 22 carbon atoms and preferably 6 to 18 carbon atoms. Examples of the alkyl (meth)acrylates include methyl (meth)acrylate, ethyl (meth)acrylate, (iso)propyl (meth)acrylate, (iso- or tertiary-) butyl (meth)acrylate, (iso)amyl (meth)acrylate, cyclohexyl (meth)acrylate, 2-ethylhexyl (meth)acrylate, (iso)octyl (meth)acrylate, (iso)decyl (meth)acrylate, (iso)dodecyl (meth)acrylate and (iso)stearyl (meth)acrylate.

Meanwhile, the terms "(iso- or tertiary-)" and "(iso)" as used herein mean both the structure in which the groups expressed by "iso or tertiary" and "iso" respectively are present, and the structure in which these groups are not present (i.e., normal), and the "(meth)acrylate" means an acrylate and/or a methacrylate.

The aromatic group-containing monomer is preferably a vinyl monomer containing an aromatic group having 6 to 22 carbon atoms which may contain a substituent group having a hetero atom, and more preferably a styrene-based monomer or an aromatic group-containing (meth)acrylate.

Specific examples of the preferred styrene-based monomer include styrene, 2-methyl styrene and vinyl benzene. Among these styrene-based monomers, more preferred is styrene.

Specific examples of the preferred aromatic group-containing (meth)acrylate include benzyl (meth)acrylate and phenoxyethyl (meth)acrylate. Among these aromatic group-containing (meth)acrylates, more preferred is benzyl (meth)acrylate.

As the hydrophobic monomer (b-2), two or more kinds of the above monomers may be used, and combination of the styrene-based monomer and the aromatic group-containing (meth)acrylate may also be used.

[(b-3) Macromonomer]

The macromonomer (b-3) is in the form of a compound containing a polymerizable functional group at one terminal end thereof and having a number-average molecular weight of not less than 500 and not more than 100,000, and is preferably used as a monomer component of the water-insoluble polymer (B) from the viewpoint of improving dispersion stability of the pigment-containing polymer particles in the ink. The polymerizable functional group bonded to one terminal end of the macromonomer is preferably an acryloyloxy group or a methacryloyloxy group and more preferably a methacryloyloxy group.

The macromonomer (b-3) preferably has a number-average molecular weight of not less than 1,000 and not more than 10,000. Meanwhile, the number-average molecular weight of the macromonomer (b-3) may be measured by gel permeation chromatography using chloroform containing 1 mmol/L of dodecyl dimethylamine as a solvent and using polystyrene as a reference standard substance.

As the macromonomer (b-3), from the viewpoint of improving dispersion stability of the pigment-containing polymer particles in the ink, there are preferably used an aromatic group-containing monomer-based macromonomer and a silicone-based macromonomer. Among these macromonomers, more preferred is the aromatic group-containing monomer-based macromonomer.

Examples of an aromatic group-containing monomer constituting the aromatic group-containing monomer-based macromonomer include those aromatic group-containing monomers as described with respect to the above hydrophobic monomer (b-2). Among these aromatic group-containing monomers, preferred are styrene and benzyl (meth)acrylate, and more preferred is styrene.

Specific examples of the styrene-based macromonomer include "AS-6(S)", "AN-6(S)" and "HS-6 (S)" (tradenames) all available from Toagosei Co., Ltd., etc.

Examples of the silicone-based macromonomer include organopolysiloxanes containing a polymerizable functional group bonded to one terminal end thereof, etc.

[(b-4) Nonionic Monomer]

From the viewpoint of improving dispersion stability of the pigment-containing polymer particles in the ink, it is preferred that the water-insoluble polymer (B) further contains (b-4) a nonionic monomer (hereinafter also referred to merely as a "component (b-4)") as a monomer component thereof.

Examples of the component (b-4) include 2-hydroxyethyl (meth)acrylate, 3-hydroxypropyl (meth)acrylate, a polyalkylene glycol (meth)acrylate such as polypropylene glycol (n=2 to 30 wherein n represents an average molar number of addition of oxyalkylene groups: hereinafter defined in the same way) (meth)acrylate and polyethylene glycol (n=2 to 30) (meth) acrylate, an alkoxy polyalkylene glycol (meth)acrylate such as methoxy polyethylene glycol (n=1 to 30) (meth)acrylate, and phenoxy (ethylene glycol/propylene glycol copolymer) (n=1 to 30 in which n for ethylene glycol: 1 to 29) (meth)acrylate.

Specific examples of commercially available products of the component (b-4) include "NK ESTER M-20G", "NK ESTER M-40G", "NK ESTER M-90G" and "NK ESTER M-230 G" all available from Shin-Nakamura Chemical Co., Ltd.; and "BLEMMER PE-90", "BLEMMER PE-200", "BLEMMER PE-350", "BLEMMER PME-100", "BLEMMER PME-200", "BLEMMER PME-400", "BLEMMER PP-500", "BLEMMER PP-800", "BLEMMER PP-1000", "BLEMMER AP-150", "BLEMMER AP-400", "BLEMMER AP-550", "BLEMMER 50PEP-300", "BLEMMER 50POEP-800B" and "BLEMMER 43PAPE-600B" all available from NOF Corporation.

These components (b-1) to (b-4) may be respectively used alone or in the form of a mixture of any two or more thereof.

(Contents of Respective Components or Constitutional Units in Monomer Mixture or Polymer)

The contents of the above components (b-1) to (b-4) in the monomer mixture (contents of non-neutralized components; hereinafter defined in the same way) upon production of the water-insoluble polymer (B), or the contents of the constitutional units derived from the components (b-1) to (b-4) in the water-insoluble polymer (B) are as follows, from the viewpoint of improving dispersion stability of the pigment-containing polymer particles in the resulting ink.

The content of the component (b-1) is preferably not less than 3% by mass, more preferably not less than 5% by mass and even more preferably not less than 7% by mass, and is also preferably not more than 40% by mass, more preferably not more than 30% by mass and even more preferably not more than 20% by mass.

The content of the component (b-2) is preferably not less than 5% by mass, more preferably not less than 10% by mass and even more preferably not less than 20% by mass, and is also preferably not more than 86% by mass, more preferably not more than 70% by mass and even more preferably not more than 50% by mass.

In the case of including the component (b-3), the content of the component (b-3) is preferably not less than 1% by mass, more preferably not less than 5% by mass and even more preferably not less than 7% by mass, and is also preferably not more than 25% by mass, more preferably not more than 20% by mass and even more preferably not more than 18% by mass.

In the case of including the component (b-4), the content of the component (b-4) is preferably not less than 5% by mass, more preferably not less than 10% by mass and even more preferably not less than 20% by mass, and is also preferably not more than 60% by mass, more preferably not more than 55% by mass and even more preferably not more than 50% by mass.

In addition, in the case of including the component (b-3), the mass ratio of the component (b-1) to a sum of the component (b-2) and the component (b-3) [component (b-1)/ [component (b-2)+component (b-3)]] is preferably from 0.01 to 1, more preferably from 0.05 to 0.60 and even more preferably from 0.10 to 0.40.

(Production of Water-Insoluble Polymer (B))

The water-insoluble polymer (B) may be produced by copolymerizing the above monomer mixture by known polymerization methods. Among the polymerization methods, preferred is a solution polymerization method.

The solvent used in the solution polymerization method is not particularly limited, and is preferably a polar organic solvent such as aliphatic alcohols having 1 to 3 carbon atoms, ketones, ethers and esters. Specific examples of the solvent include methanol, ethanol, acetone and methyl ethyl ketone. Of these solvents, preferred is methyl ethyl ketone.

The polymerization may be carried out in the presence of a polymerization initiator or a chain transfer agent. As the polymerization initiator, preferred are azo compounds, and more preferred is 2,2'-azobis(2,4-dimethylvaleronitrile). As the chain transfer agent, preferred are mercaptans, and more preferred is 2-mercaptoethanol.

The preferred polymerization conditions may vary depending upon the kind of polymerization initiator used, etc. The polymerization temperature is preferably not lower than 50° C. and not higher than 90° C., and the polymerization time is preferably not less than 1 h and not more than 20 h. Further, the polymerization is preferably conducted in a nitrogen gas atmosphere or an atmosphere of an inert gas such as argon.

After completion of the polymerization reaction, the polymer thus produced may be isolated from the reaction solution by a known method such as reprecipitation and removal of the solvent by distillation. The thus obtained polymer may be subjected to reprecipitation, membrane separation, chromatography, extraction, etc., for removing unreacted monomers, etc., therefrom.

The water-insoluble polymer (B) is preferably used s such in the form of a polymer solution without removing the solvent used in the polymerization reaction therefrom in order to use the organic solvent contained therein as an organic solvent in the below-mentioned step I, from the viewpoint of enhancing productivity of the below-mentioned water dispersion of the pigment-containing polymer particles.

The solid content of the water-insoluble polymer (B) solution is preferably not less than 30% by mass and more preferably not less than 40% by mass, and is also preferably not more than 70% by mass and more preferably not more than 65% by mass from the viewpoint of enhancing productivity of the water dispersion of the pigment-containing polymer particles.

The weight-average molecular weight of the water-insoluble polymer (B) used in the present invention is preferably not less than 5,000, more preferably not less than 10,000 and even more preferably not less than 20,000, and is also preferably not more than 500,000, more preferably not more than 400,000, even more preferably not more than 300,000 and further even more preferably not more than 200,000, from the viewpoint of improving dispersion stability of the pigment-containing polymer particles in the resulting ink as well as fixing strength of the water-based ink on a low-water absorbing recording medium.

Meanwhile, the weight-average molecular weight may be measured by the method described in Examples below.

[Production of Pigment-Containing Polymer Particles]

The water-based ink for ink-jet printing according to the present invention may contain the water-insoluble polymer particles containing the pigment (A).

The water-insoluble polymer (B) particles containing the pigment (A) (pigment-containing polymer particles) can be efficiently produced in the form of a water dispersion thereof by the process including the following steps I and II.

Step I: subjecting a mixture of the water-insoluble polymer (B), an organic solvent, the pigment (A) and water (hereinafter also referred to as a "pigment mixture") to dispersion treatment to obtain a dispersion of pigment-containing polymer particles; and Step II: removing the organic solvent from the dispersion obtained in the step I to obtain a water dispersion of the pigment-containing polymer particles (hereinafter also referred to merely as a "pigment water dispersion").

In addition, the above process may further include the following step III as an optional step.

Step III: mixing the water dispersion obtained in the step II with a crosslinking agent to subject the water dispersion to crosslinking treatment, thereby obtaining a water dispersion of the crosslinked product.

(Step I)

In the step I, it is preferred that the water-insoluble polymer (B) is first dissolved in the organic solvent, and then the pigment (A) and water, if required, together with a neutralizing agent, a surfactant and the like, are added and mixed in the resulting organic solvent solution to obtain a dispersion of an oil-in-water type. The order of addition of the respective components added to the organic solvent solution of the water-insoluble polymer (B) is not particularly limited, and it is preferred that water, the neutralizing agent and the pigment (A) are successively added in this order.

The organic solvent in which the water-insoluble polymer (B) can be dissolved is not particularly limited, and is preferably selected from aliphatic alcohols having 1 to 3 carbon atoms, ketones, ethers, esters and the like. Of these organic solvents, from the viewpoints of improving wettability to the pigment (A), solubility of the water-insoluble polymer (B) and adsorption of the water-insoluble polymer (B) onto the pigment (A), more preferred are ketones having not less than 4 and not more than 8 carbon atoms, even more preferred are methyl ethyl ketone and methyl isobutyl ketone, and further even more preferred is methyl ethyl ketone.

When the water-insoluble polymer (B) is synthesized by a solution polymerization method, the solvent used in the polymerization method may be directly used as such in the step I.

(Neutralization)

When the water-insoluble polymer (B) is an anionic polymer, an anionic group contained in the water-insoluble polymer (B) may be neutralized using a neutralizing agent. When using the neutralizing agent, the pH value of the water-insoluble polymer (B) is preferably controlled to not less than 7 and not more than 11.

Examples of the neutralizing agent include hydroxides of alkali metals, ammonia and organic amines. Specific examples of the hydroxides of alkali metals include lithium hydroxide, sodium hydroxide, potassium hydroxide and cesium hydroxide. Of these hydroxides of alkali metals, preferred is sodium hydroxide. Specific examples of the organic amines include trimethylamine, ethylamine, diethylamine, triethylamine and triethanolamine.

Of these neutralizing agents, from the viewpoint of improving ejection stability and storage stability of the resulting water-based ink, preferred are the hydroxides of alkali metals and ammonia, and more preferred is combination of sodium hydroxide and ammonia. Also, the water-insoluble polymer (B) may be previously neutralized.

The neutralizing agent is preferably used in the form of an aqueous neutralizing agent solution from the viewpoint of sufficiently and uniformly accelerating the neutralization of the polymer. From the aforementioned viewpoint, the concentration of the aqueous neutralizing agent solution is preferably not less than 3% by mass, more preferably not less than 10% by mass and even more preferably not less than 15% by mass, and is also preferably not more than 30% by mass and more preferably not more than 25% by mass.

The degree of neutralization of the anionic group in the water-insoluble polymer (B) is preferably not less than 30 mol %, more preferably not less than mol % and even more preferably not less than 50 mol %, and is also preferably not more than 300 mol %, more preferably not more than 200 mol % and even more preferably not more than 150 mol %, from the viewpoint of improving dispersion stability and storage stability of the pigment-containing polymer particles in the pigment water dispersion and the ink.

The degree of neutralization as used herein means the value calculated by dividing a mol equivalent amount of the neutralizing agent by a molar amount of the anionic group in the water-insoluble polymer (B).

(Contents of Respective Components in Pigment Mixture)

The content of the pigment (A) in the pigment mixture used in the step I is preferably not less than 10% by mass, more preferably not less than 12% by mass and even more preferably not less than 14% by mass, and is also preferably not more than 30% by mass, more preferably not more than 25% by mass and even more preferably not more than 20% by mass, from the viewpoint of improving dispersion stability of the pigment-containing polymer particles in the pigment water dispersion and the ink as well as from the viewpoint of enhancing productivity of the pigment water dispersion.

The content of the water-insoluble polymer (B) in the pigment mixture is preferably not less than 2.0% by mass, more preferably not less than 4.0% by mass and even more preferably not less than 5.0% by mass, and is also preferably not more than 15% by mass, more preferably not more than 12% by mass and even more preferably not more than 10% by mass, from the viewpoint of improving dispersion stability of the pigment water dispersion as well as storage stability and ejection stability of the water-based ink, and from the viewpoint of improving quick-drying fixing properties of the water-based ink and image uniformity when printed on a low-water absorbing recording medium.

The content of the organic solvent in the pigment mixture is preferably not less than 10% by mass, more preferably not less than 12% by mass and even more preferably not less than 15% by mass, and is also preferably not more than 35% by mass, more preferably not more than 30% by mass and even more preferably not more than 25% by mass, from the viewpoint of improving wettability to the pigment (A) and adsorption of the water-insoluble polymer (B) to the pigment (A).

The content of water in the pigment mixture is preferably not less than 40% by mass, more preferably not less than 45% by mass and even more preferably not less than 50% by mass, and is also preferably not more than 75% by mass, more preferably not more than 70% by mass and even more preferably not more than 65% by mass, from the viewpoints of improving dispersion stability of the pigment water dispersion and enhancing productivity of the pigment water dispersion.

The mass ratio of the pigment (A) to the water-insoluble polymer (B) [(A)/(B)] in the pigment mixture is preferably not less than 30/70, more preferably not less than 40/60 and even more preferably not less than 50/50, and is also preferably not more than 90/10, more preferably not more than 80/20 and even more preferably not more than 70/30, from the viewpoint of improving dispersion stability of the pigment water dispersion as well as storage stability and ejection stability of the ink, and from the viewpoint of improving quick-drying fixing properties of the water-based ink and image uniformity when printed on a low-water absorbing recording medium.

(Dispersion Treatment of Pigment Mixture)

In the step I, the pigment mixture is subjected to dispersion treatment to obtain a dispersion of the pigment-containing polymer particles. The dispersing method for obtaining the above dispersion is not particularly limited. The pigment particles may be atomized into fine particles having a desired average particle size only by a substantial dispersion treatment. Preferably, the pigment mixture is first subjected to a preliminary dispersion treatment, and then to the substantial dispersion treatment by applying a shear stress thereto so as to control the average particle size of the obtained pigment particles to a desired value.

The temperature used in the preliminary dispersion treatment in the step I is preferably not lower than 0° C., and is also preferably not higher than 40° C., more preferably not higher than 30° C. and even more preferably not higher than 20° C. The dispersing time is preferably not less than 0.5 h and more preferably not less than 1 h, and is also preferably not more than 30 h, more preferably not more than 10 h and even more preferably not more than 5 h.

When subjecting the pigment mixture to the preliminary dispersion treatment, there may be used ordinary mixing or stirring devices such as anchor blades and disper blades. Of these devices, preferred are high-speed stirring mixers.

As a means for applying a shear stress to the pigment mixture in the substantial dispersion treatment, there may be used, for example, kneading machines such as roll mills and kneaders, high-pressure homogenizers such as "MICRO-FLUIDIZER" available from Microfluidics Corporation, and media-type dispersers such as paint shakers and beads mills. Examples of the commercially available media-type dispersers include "Ultra Apex Mill" available from Kotobuki Industries Co., Ltd., and "Pico Mill" available from Asada Iron Works Co., Ltd. These devices may be used in combination of any two or more thereof. Among these devices, the high-pressure homogenizers are preferably used from the viewpoint of reducing a particle size of the pigment.

In the case where the substantial dispersion treatment is conducted using the high-pressure homogenizer, the particle size of the pigment can be adjusted to a desired value by controlling the treating pressure and the number of passes through the homogenizer used in the substantial dispersion treatment.

The treating pressure used in the substantial dispersion treatment is preferably not less than 60 MPa, more preferably not less than 100 MPa and even more preferably not less than 130 MPa, and is also preferably not more than 200 MPa and more preferably not more than 180 MPa, from the viewpoint of enhancing productivity and cost efficiency.

Also, the number of passes through the homogenizer used in the substantial dispersion treatment is preferably not less than 3, more preferably not less than 10, and is also preferably not more than 30 and more preferably not more than 25.

(Step II)

In the step II, the organic solvent is removed from the dispersion obtained in the step I by any known methods to obtain a water dispersion of the pigment-containing polymer particles (pigment water dispersion). The organic solvent is preferably substantially completely removed from the thus obtained pigment water dispersion. However, the residual organic solvent may be present in the pigment water dispersion unless the objects and effects of the present invention are adversely affected by the residual organic solvent. The content of the residual organic solvent in the pigment water dispersion is preferably not more than 0.1% by weight and more preferably not more than 0.01% by weight.

In addition, if required, the dispersion may be subjected to heating and stirring treatments before removing the organic solvent by distillation therefrom.

In the thus-obtained pigment water dispersion, the solid water-insoluble polymer (B) particles containing the pigment (A) are dispersed in a medium containing water as a main medium. The configuration of the pigment-containing polymer particles in the pigment water dispersion is not particularly limited, and the pigment-containing polymer particles may have any configuration as long as the particles are formed of at least the pigment (A) and the water-insoluble polymer (B). Examples of the configuration of the pigment-containing polymer particles include the particle configuration in which the pigment (A) is enclosed in the water-insoluble polymer (B), the particle configuration in which the pigment (A) is uniformly dispersed in the water-insoluble polymer (B), and the particle configuration in which the pigment (A) is exposed onto a surface of the respective water-insoluble polymer (B) particles, as well as mixtures of these configurations.

(Step III)

The step III is an optional step. In the step III, the water dispersion obtained in the step II is mixed with a crosslinking agent to subject the water dispersion to crosslinking treatment, thereby obtaining a water dispersion of the crosslinked product. The step III is preferably carried out from the viewpoint of improving storage stability of the pigment water dispersion and the resulting water-based ink.

When the water-insoluble polymer (B) is an anionic water-insoluble polymer containing an anionic group, the crosslinking agent used in the step III is preferably in the form of a compound containing a functional group capable of reacting with the anionic group of the polymer, more preferably a compound containing the two or more functional groups in a molecule thereof and even more preferably a compound containing the 2 to 6 functional groups in a molecule thereof.

Suitable examples of the crosslinking agent include compounds containing two or more epoxy groups in a molecule thereof, compounds containing two or more oxazoline groups in a molecule thereof, and compounds containing two or more isocyanate groups in a molecule thereof. Among these crosslinking agents, preferred are compounds containing two or more epoxy groups in a molecule thereof, and more preferred is trimethylolpropane polyglycidyl ether.

The concentration of the non-volatile components (solid content) in the resulting pigment water dispersion is preferably not less than 10% by mass and more preferably not less than 15% by mass, and is also preferably not more than 30% by mass and more preferably not more than 25% by mass from the viewpoint of improving dispersion stability of the pigment water dispersion as well as from the viewpoint of facilitating preparation of the water-based ink.

The average particle size of the pigment-containing polymer particles in the pigment water dispersion is preferably not less than 40 nm, more preferably not less than 60 nm and even more preferably not less than 75 nm, and is also preferably not more than 150 nm, more preferably not more than 120 nm and even more preferably not more than 110 nm, from the viewpoints of suppressing formation of coarse particles and improving ejection stability of the water-based ink.

Meanwhile, the average particle size of the pigment-containing polymer particles may be measured by the method described in Examples below.

The average particle size of the pigment-containing polymer particles in the water-based ink is the same as the average particle size of the particles in pigment water dispersion, and the preferred ranges of the average particle size of the pigment-containing polymer particles in the water-based ink are also the same as those of the average particle size of the particles in pigment water dispersion.

[Water-Insoluble Polymer (B) Particles Containing No Pigment]

The water-based ink according to the present invention which is obtained by the aforementioned Method (II) contains the water-insoluble polymer (B) particles containing no pigment, from the viewpoints of accelerating drying of the printed characters or images on an ink-jet recording medium (surface of paper) and improving quick-drying fixing properties of the water-based ink and image uniformity when printed on a low-water absorbing recording medium as well as storage stability and ejection stability of the water-based ink.

As the water-insoluble polymer (B) particles containing no pigment, there may be used the aforementioned water-insoluble polymer (B). The water-insoluble polymer used in the water-insoluble polymer (B) particles containing the pigment (A) and the water-insoluble polymer used in the water-insoluble polymer (B) particles containing no pigment may be identical to or different from each other. As the configuration of the water-insoluble polymer, there may be mentioned a dispersion prepared by dispersing the water-insoluble polymer particles in water as a continuous phase, and the dispersion may also contain a dispersant such as a surfactant, if required. The water-insoluble polymer particles also act as a fixing emulsion used for fixing ink droplets on a recording medium and improving optical density, gloss and rub fastness of the printed characters or images.

The water-insoluble polymer (B) particles containing no pigment are preferably used in the form of a dispersion of the water-insoluble polymer (B) particles, from the viewpoint of enhancing productivity of the water-based ink.

The content of the water-insoluble polymer (B) particles in the dispersion of the water-insoluble polymer (B) particles containing no pigment is preferably not less than 10% by mass, more preferably not less than 20% by mass and even more preferably not less than 30% by mass, and is also preferably not more than 70% by mass, more preferably not more than 60% by mass and even more preferably not more than 55% by mass, from the viewpoint of improving dispersion stability of the water-insoluble polymer (B) particles in the dispersion as well as convenience of handling when compounding the dispersion in the ink.

In addition, the average particle size of the water-insoluble polymer (B) particles containing no pigment in the water-based ink is preferably not less than 10 nm, more preferably not less than 30 nm and even more preferably not less than 50 nm, and is also preferably not more than 300 nm, more preferably not more than 150 nm and even more preferably not more than 100 nm, from the viewpoint of improving storage stability of the water-based ink as well as quick-drying fixing properties of the water-based ink and image uniformity when printed on a low-water absorbing recording medium. Meanwhile, the average particle size of the water-insoluble polymer (B) particles may be measured by the method described in Examples below.

The water-insoluble polymer (B) particles containing no pigment which are usable in the present invention may be either a synthesized product as described above or a commercially available product. Examples of the commercially available product of the dispersion of the water-insoluble polymer particles include dispersions of particles formed of an acrylic resin, a styrene-based resin, a urethane-based resin, a polyester-based resin, a styrene-acrylic resin, a butadiene-based resin, a styrene-butadiene-based resin, a vinyl chloride-based resin, a vinyl acetate-based resin, an acrylic silicone-based resin or the like. Of these dispersions, from the aforementioned viewpoints, preferred are dispersions of particles formed of an acrylic resin, a urethane-based resin, a styrene-butadiene-based resin, a styrene-acrylic resin or a vinyl chloride-based resin. Specific examples of the commercially available product of the dispersion of the water-insoluble polymer particles include dispersions of acrylic resins such as "Neocryl A1127" (anionic self-crosslinked aqueous acrylic resin) available from DSM NeoResins, Inc., and "JONCRYL 390" available from BASF Japan, Ltd.; dispersions of urethane resins such as "WBR-2018" and "WBR-2000U" both available from Taisei Fine Chemical Co., Ltd.; dispersions of styrene-butadiene resins such as "SR-100" and "SR102" both available from Nippon A & L Inc.; dispersions of styrene-acrylic resins such as "JONCRYL 7100", "JONCRYL 737" and "JONCRYL 538" all available from BASF Japan, Ltd.; and dispersions of vinyl chloride-based resins such as "VINYBLAN 701" available from Nissin Chemical Industry Co., Ltd.

<Organic Solvent (C)>

The water-based ink according to the present invention includes the organic solvent (C) from the viewpoint of improving ejection stability thereof. The organic solvent (C) further includes diethylene glycol isopropyl ether (c1) and an organic solvent (c2) having a 1-octanol/water partition coefficient that is smaller than that of the diethylene glycol isopropyl ether (c1).

The "1-octanol/water partition coefficient" as used herein may be measured by the method described in Examples below.

The 1-octanol/water partition coefficient of the diethylene glycol isopropyl ether (c1; boiling point: 207° C.) is 0.04, and the 1-octanol/water partition coefficient of the organic solvent (c2) is the value smaller than 0.04.

The boiling point of the organic solvent (c2) is preferably not lower than 170° C., more preferably not lower than 175° C., even more preferably not lower than 180° C., and further even more preferably not lower than 185° C., from the viewpoint of improving ejection stability of the resulting water-based ink.

The organic solvent (c2) is preferably at least one compound selected from the group consisting of a compound represented by the following general formula (1) or (2), and a nitrogen-containing heterocyclic compound which have a 1-octanol/water partition coefficient smaller than 0.04, from the viewpoint of improving ejection stability of the resulting water-based ink.

(Compound Represented by General Formula (1))

$$R^1-O-(AO)_n-H \quad (1)$$

wherein $R^1$ is a hydrogen atom, a methyl group or an ethyl group; AO is an alkyleneoxy group having 2 or 3 carbon atoms; n represents an average molar number of addition of AO and is a number of not less than 1 and not more than 10.

In the general formula (1), n is preferably not more than 8, more preferably not more than 5 and even more preferably not more than 4.

Examples of the compound represented by the general formula (1) include propylene glycol, dipropylene glycol, tripropylene glycol, diethylene glycol, triethylene glycol, tetraethylene glycol, monoethylene glycol monomethyl ether, monoethylene glycol monoethyl ether, monopropylene glycol monomethyl ether, monopropylene glycol monoethyl ether, polyethylene glycol (molar number of addition of EO: 2 to 10, preferably 2 to 4) monomethyl ether, polyethylene glycol (molar number of addition of EO: 2 to 10, preferably 2 to 4) monoethyl ether, polypropylene glycol (molar number of addition of EO: 2 to 10, preferably 2 to 4) monomethyl ether and polypropylene glycol (molar number of addition of EO: 2 to 10, preferably 2 to 4) monoethyl ether.

Of these compounds, preferred is at least one compound selected from the group consisting of propylene glycol, dipropylene glycol, diethylene glycol, triethylene glycol, monoethylene glycol monomethyl ether, monoethylene glycol monoethyl ether, monopropylene glycol monomethyl ether, monopropylene glycol monoethyl ether, polyethylene glycol (molar number of addition of EO: 2 to 4) monomethyl ether, polyethylene glycol (molar number of addition of EO: 2 to 4) monoethyl ether, polypropylene glycol (molar number of addition of EO: 2 to 4) monomethyl ether and polypropylene glycol (molar number of addition of EU: 2 to 4) monoethyl ether; and more preferred is at least one compound selected from the group consisting of propylene glycol (1-octanol/water partition coefficient: −0.95, the partition coefficients described below in this paragraph have the same definition; boiling point: 188° C.), dipropylene glycol (partition coefficient: −0.75; boiling point: 232° C.), diethylene glycol (partition coefficient: −1.39; boiling point: 244° C.), triethylene glycol (partition coefficient: −1.45; boiling point: 285° C.), diethylene glycol monomethyl ether (partition coefficient: −0.85; boiling point: 194° C.), and diethylene glycol monoethyl ether (partition coefficient: −0.31; boiling point: 202° C.).

(Compound Represented by General Formula (2))

$$\begin{array}{l} CH_2-O-(EO)_{m1}-H \\ | \\ CH-O-(EO)_{m2}-H \\ | \\ CH_2-O-(EO)_{m3}-H \end{array} \quad (2)$$

wherein EO is an ethyleneoxy group; and m1, m2 and m3 respectively represent an average molar number of addition of EO with the proviso that a sum of m1, m2 and m3 (m1+m2+m3) is not less than 0 and not more than 10.

In the general formula (2), the value of (m1+m2+m3) is preferably not more than 8, more preferably not more than 5 and even more preferably not more than 4.

Examples of the compound represented by the general formula (2) include glycerol (1-octanol/water partition coefficient: −1.5; boiling point: 290° C.) and an ethyleneoxide adduct of glycerol (molar number of addition of EO: 1 to 10, preferably 1 to 8, more preferably 1 to 5 and even more preferably 1 to 4).

(Nitrogen-Containing Heterocyclic Compound)

Examples of the nitrogen-containing heterocyclic compound include 2-pyrrolidone (1-octanol/water partition coefficient: −0.63; boiling point: 251° C.), etc.

(Contents of Respective Components in Water-Based Ink)

The content of the pigment (A) in the water-based ink is preferably not less than 1.0% by mass, more preferably not less than 2.0% by mass and even more preferably not less than 2.5% by mass, from the viewpoint of enhancing optical density of the water-based ink. Also, the content of the pigment (A) in the water-based ink is preferably not more than 15.0% by mass, more preferably not more than 10.0% by mass and even more preferably not more than 7.0% by mass, from the viewpoints of reducing viscosity of the ink upon evaporating the solvent therefrom, and improving quick-drying fixing properties of the water-based ink and image uniformity when printed on a low-water absorbing recording medium as well as storage stability and ejection stability of the water-based ink.

The content of the water-insoluble polymer (B) in the water-based ink is preferably not less than 0.5% by mass, more preferably not less than 0.8% by mass and even more preferably not less than 1.0% by mass, and is also preferably not more than 6.0% by mass, more preferably not more than 4.0% by mass and even more preferably not more than 3.0% by mass, from the viewpoint of improving storage stability and ejection stability of the water-based ink as well as quick-drying fixing properties of the water-based ink and image uniformity when printed on a low-water absorbing recording medium.

Meanwhile, the content of the water-insoluble polymer (B) in the water-based ink means the total content of the water-insoluble polymer contained in the water-insoluble polymer (B) particles containing the pigment and the water-insoluble polymer contained in the water-insoluble polymer (B) particles containing no pigment.

The total content of the pigment (A) and the water-insoluble polymer (B) in the water-based ink is preferably not less than 1.5% by mass and not more than 21.0% by mass. The total content of the components (A) and (B) in the water-based ink is more preferably not less than 2.3% by mass, even more preferably not less than 2.5% by mass, further even more preferably not less than 4.0% by mass and further even more preferably not less than 5.0% by mass, and is also more preferably not more than 14.0% by mass, even more preferably not more than 10.0% by mass, further even more preferably not more than 9.0% by mass and further even more preferably not more than 8.0% by mass.

The mass ratio of the water-insoluble polymer (B) to the pigment (A) [pigment (A)/water-insoluble polymer (B)] in the water-based ink is preferably not less than 100/300, more preferably not less than 100/200 and even more preferably not less than 100/150, and is also preferably not more than 100/25, more preferably not more than 100/50 and even more preferably not more than 100/70, from the viewpoints of accelerating drying of printed characters or images on a low-water absorbing recording medium and improving quick-drying fixing properties and optical density of the water-based ink and image uniformity.

The content of the pigment-containing polymer particles in the water-based ink is preferably not less than 1.0% by mass, more preferably not less than 3.0% by mass and even more preferably not less than 4.0% by mass, from the viewpoint of enhancing optical density of the water-based ink. Also, the content of the pigment-containing polymer particles in the water-based ink is preferably not more than 20.0% by mass, more preferably not more than 10.0% by mass and even more preferably not more than 8.0% by mass, from the viewpoints of reducing viscosity of the water-based ink upon evaporating the solvent therefrom, and improving quick-drying fixing properties of the water-based ink and image uniformity when printed on a low-water absorbing recording medium as well as storage stability and ejection stability of the water-based ink.

The content of the organic solvent (C) in the water-based ink is preferably not less than 5.0% by mass, more preferably not less than 10.0% by mass, even more preferably not less than 16.0% by mass and further even more preferably not less than 18.0% by mass, and is also preferably not more than 70.0% by mass, more preferably not more than 60.0% by mass, even more preferably not more than 45.0% by mass and further even more preferably not more than 40.0% by mass, from the viewpoint of improving ejection stability of the ink.

The content of the diethylene glycol isopropyl ether (c1) in the organic solvent (C) is preferably not less than 1.0% by mass, more preferably not less than 3.0% by mass, even more preferably not less than 5.0% by mass and further even more preferably not less than 8.0% by mass, and is also preferably not more than 35.0% by mass, more preferably not more than 32.0% by mass, even more preferably not more than 28.0% by mass and further even more preferably not more than 20.0% by mass, from the viewpoints of suppressing increase in viscosity of the water-based ink, and improving ejection stability, storage stability and quick-drying fixing properties of the water-based ink as well as image uniformity.

The content of the organic solvent (c2) in the organic solvent (C) is preferably not less than 1.0% by mass, more preferably not less than 2.0% by mass, even more preferably not less than 5.0% by mass, further even more preferably not less than 8.0% by mass and further even more preferably not less than 10.0% by mass, and is also preferably not more than 40.0% by mass, more preferably not more than 35.0% by mass, even more preferably not more than 30.0% by mass, further even more preferably not more than 25.0% by mass and further even more preferably not more than 20.0% by mass, from the viewpoints of allowing the component (c1) to be stably present in the water-based ink, and improving ejection stability, storage stability and quick-drying fixing properties of the water-based ink as well as image uniformity.

The total content of the components (c1) and (c2) in the organic solvent (C) is preferably not less than 5.0% by mass, more preferably not less than 8.0% by mass, even more preferably not less than 10.0% by mass and further even more preferably not less than 11.0% by mass, and is also preferably not more than 40.0% by mass, more preferably not more than 60.0% by mass, even more preferably not more than 40.0% by mass, further even more preferably not more than 30.0% by mass and further even more preferably not more than 25.0% by mass.

The organic solvent (C) may also contain the other organic solvents than the components (c1) and (c2) for the purpose of controlling viscosity of the water-based ink and improving moisture retention of the water-based ink unless the stability of the water-based ink is adversely affected.

The total content of the pigment (A), the water-insoluble polymer (B) and the diethylene glycol isopropyl ether (c1) [(A)+(B)+(c1)] in the water-based ink is not less than 5.0% by mass, from the viewpoints of controlling the interaction between the components in an adequate range to suppress aggregation thereof, and improving ejection stability, storage stability and quick-drying fixing properties of the water-based ink as well as and image uniformity of printed characters or images. The total content of the pigment (A), the water-insoluble polymer (B) and the diethylene glycol isopropyl ether (c1) in the water-based ink is preferably not less than 8.0% by mass, more preferably not less than 10.0% by mass, even more preferably not less than 12.0% by mass and further even more preferably not less than 14.0% by mass, and is also preferably not more than 45% by mass, more preferably not more than 42% by mass, even more preferably not more than 40% by mass and further even more preferably not more than 35% by mass.

The value obtained by multiplying the total content (% by mass) of the pigment (A) and the water-insoluble polymer (B) in the water-based ink by the content (% by mass) of the diethylene glycol isopropyl ether (c1) in the water-based ink $\{[(A)+(B)]\times(c1)\}$ is not less than 10 and not more than 300, from the viewpoint of improving ejection stability, storage stability and quick-drying fixing properties of the water-based ink as well as and image uniformity of printed characters or images. The above value $\{[(A)+(B)]\times(c1)\}$ is preferably not less than 15, more preferably not less than 20, even more preferably not less than 30, further even more preferably not less than 40 and further even more preferably not less than 55, and is also preferably not more than 290, more preferably not more than 250, even more preferably not more than 200, further even more preferably not more than 150 and further even more preferably not more than 80.

The content of water in the water-based ink is preferably not less than 20% by mass, more preferably not less than 30% by mass and even more preferably not less than 40% by mass, from the viewpoint of improving quick-drying fixing properties of the water-based ink and image uniformity when printed on a low-water absorbing recording medium, as well as from the viewpoint of improving storage stability of the water-based ink, and is also preferably not more than 70% by mass, more preferably not more than 65% by mass and even more preferably not more than 60% by mass, from the viewpoint of improving ejection stability of the water-based ink.

[Other Components]

The water-based ink according to the present invention may also contain, in addition to the aforementioned components (A) to (C), various ordinary additives such as a humectant, a wetting agent, a penetrant, a dispersant, a surfactant, a viscosity controller, a defoaming agent, an antiseptic agent, a mildew-proof agent and a rust preventive. Further, organic solvents such as acetylene glycol and alkyleneoxy (such as ethyleneoxy and propyleneoxy) adducts of acetylene glycol, etc., may also be added to the water-based ink.

[Properties of Ink]

The viscosity of the water-based ink as measured at 32° C. is preferably not less than 2.0 mPa·s, more preferably not less than 3.0 mPa·s and even more preferably not less than 5.0 mPa·s, from the viewpoint of improving ejection property of the water-based ink, and is also preferably not more than 12 mPa·s, more preferably not more than 9.0 mPa·s and even more preferably not more than 7.0 mPa·s, from the viewpoint of improving storage stability and ejection stability of the water-based ink.

Meanwhile, the viscosity of the water-based ink at 32° C. may be measured by the method described in Examples below.

The pH value of the water-based ink is preferably not less than 7.0, more preferably not less than 8.0 and even more preferably not less than 8.5, from the viewpoint of improving storage stability and ejection stability of the water-based ink, as well as from the viewpoints of spreading a dot size of the ink and improving optical density, gloss and rub fastness of printed characters or images when printed on a low-water absorbing recording medium, and is also preferably not more than 11.0, more preferably not more than 10.0 and even more preferably not more than 9.5, from the viewpoint of improving resistance of members to the water-based ink and suppressing skin irritation.

Meanwhile, the pH value of the water-based ink may be measured by the method described in Examples below.

[Image Forming Method]

The image forming method according to the present invention includes the steps of;

mounting a container filled with the aforementioned water-based ink for ink-jet printing to an ink jet printing apparatus equipped with an ink ejecting means; and ejecting the ink onto a recording medium having a water absorption of not less than 0 g/m² and not more than 10 g/m² as measured by contacting with pure water for 100 ms to print characters or images thereon.

<Ink-Jet Recording Medium>

The low-water absorbing recording medium used in the image forming method according to the present invention has the following water absorption.

The water absorption of the ink-jet recording medium as measured by contacting with pure water for 100 ms is not less than 0 g/m² and not more than 10 g/m². More specifically, the water absorption of the ink-jet recording medium as measured by contacting with pure water for 100 ms is preferably not less than 1.0 g/m², more preferably not less than 2.0 g/m², even more preferably not less than 3.0 g/m² and further even more preferably not less than 4.0 g/m², from the viewpoint of promoting drying of printed characters or images, enhancing fixing strength of the water-based ink and suppressing color unevenness of printed characters or images, and is also preferably not more than 8.0 g/m², more preferably not more than 7.0 g/m², even more preferably not more than 6.0 g/m² and further even more preferably not more than 5.5 g/m², from the viewpoints of suppressing color unevenness of printed characters or images and enhancing optical density and gloss of the water-based ink. Meanwhile, the water absorption of the ink-jet recording medium as measured by contacting with pure water for 100 ms may be measured by the method described in Examples below.

The 60° gloss of the recording medium is preferably not less than 5, more preferably not less than 20 and even more preferably not less than 30, and is also preferably not more than 200, from the viewpoint of enhancing gloss and visibility of printed characters or images. The 60° gloss of the recording medium may be measured by a gloss meter "HANDY GLOSSMETER, Model No.: PG-1M" available from Nippon Denshoku Industries Co., Ltd.

The ink jet recording medium used in the present invention may be a coated paper or a film.

Examples of the coated paper include "OK Topcoat+" (basis weight: 104.7 g/m$^2$; 60° gloss: 49.0; water absorption as measured by contacting with pure water for 100 ms (hereinafter defined in the same way): 4.9 g/m$^2$) available from Oji Paper Co., Ltd., a multi-color foam gloss coated paper (basis weight: 104.7 g/m$^2$; 60° gloss: 36.8; water absorption: 5.2 g/m$^2$) available from Oji Paper Co., Ltd., "UPM Finesse Gloss" (basis weight: 115 g/m$^2$; 60° gloss: 27.0; water absorption: 3.1 g/m$^2$) available from UPM, "UPM Finesse Matt" (basis weight: 115 g/m$^2$; 60° gloss: 5.6; water absorption: 4.4 g/m$^2$) available from UPM, "TerraPress Silk" (basis weight: 80 g/m$^2$; 60° gloss: 6.0; water absorption: 4.1 g/m$^2$) available from Stora Enso, and "LumiArt" (basis weight: 90 g/m$^2$; 60° gloss: 26.3) available from Stora Enso.

Examples of the film include a polyester film, a vinyl chloride film, a polypropylene film, a polyethylene film and a nylon film. These films may be subjected to surface treatments such as corona treatment, etc., if required.

Examples of the generally available films include "LUMIRROR T60" (polyethylene terephthalate; thickness: 125 μm; 60° gloss: 189.1; water absorption: 2.3 g/m$^2$) available from Toray Industries Inc., "PVC80B P" (polyvinyl chloride; 60° gloss: 58.8; water absorption: 1.4 g/m$^2$) available from Lintec Corporation, "KINATH KEE 70CA" (polyethylene) available from Lintec Corporation, "YUPO SG90 PAT1" (polypropylene) available from Lintec Corporation, and "BONYL RX" (nylon) available from Kohjin Film & Chemical Co., Ltd.

The image forming method according to the present invention may further include the step of drying characters or images formed on the ink-jet recording medium after printing the characters or images thereon by ejecting the water-based ink thereto.

The ink ejecting means may include a thermal-type or piezoelectric-type ink-jet print head for ejecting the water-based ink to the ink-jet recording medium. In the present invention, there is preferably used the method of ejecting the water-based ink to the ink-jet recording medium using a piezoelectric-type ink-jet print head to print the characters or images thereon.

With respect to the aforementioned embodiments, the present invention further provides the following aspects relating to the water-based ink for ink-jet printing and the image forming method.

<1> A water-based ink for ink-jet printing, including a pigment (A), a water-insoluble polymer (B), an organic solvent (C) and water, in which the organic solvent (C) includes diethylene glycol isopropyl ether (c1) and an organic solvent (c2) having a 1-octanol/water partition coefficient that is smaller than that of the diethylene glycol isopropyl ether (c1); a total content of the pigment (A), the water-insoluble polymer (B) and the diethylene glycol isopropyl ether (c1) in the water-based ink is not less than 5.0% by mass; and a value obtained by multiplying a total content (% by mass) of the pigment (A) and the water-insoluble polymer (B) in the water-based ink by a content (% by mass) of the diethylene glycol isopropyl ether (c1) in the water-based ink is not less than and not more than 300.

<2> The water-based ink according to the aspect <1>, wherein the water-based ink includes the water-insoluble polymer (B) particles comprising the pigment (A), the organic solvent (C) and water.

<3> The water-based ink according to the aspect <1> or <2>, wherein the water-based ink includes the water-insoluble polymer (B) particles containing the pigment (A) (pigment-containing polymer particles), the water-insoluble polymer (B) particles containing no pigment (A), the organic solvent (C) and water.

<4> The water-based ink according to any one of the aspects <1> to <3>, wherein the water-insoluble polymer (B) is a vinyl-based polymer containing a constitutional unit derived from an ionic monomer (b-1) and a constitutional unit derived from a hydrophobic monomer (b-2).

<5> The water-based ink according to any one of the aspects <1> to <4>, wherein the ionic monomer (b-1) is preferably a carboxylic acid monomer, more preferably acrylic acid or methacrylic acid, and even more preferably methacrylic acid.

<6> The water-based ink according to any one of the aspects <1> to <5>, wherein the hydrophobic monomer (b-2) is preferably an alkyl (meth)acrylate or an aromatic group-containing monomer; more preferably at least one compound selected from the group consisting of an alkyl (meth)acrylate containing an alkyl group having 1 to 22 carbon atoms and preferably 6 to 18 carbon atoms, a styrene-based monomer and an aromatic group-containing (meth)acrylate; even more preferably at least one compound selected from the group consisting of styrene, 2-methylstyrene, divinyl benzene, benzyl (meth)acrylate and phenoxyethyl (meth)acrylate; and further even more preferably at least one compound selected from the group consisting of styrene and benzyl (meth)acrylate.

<7> The water-based ink according to any one of the aspects <1> to <6>, wherein the water-insoluble polymer (B) further includes a constitutional unit derived from a macromonomer (b-3).

<8> The water-based ink according to the aspect <7>, wherein the macromonomer (b-3) is preferably an aromatic group-containing monomer-based macromonomer or a silicone-based macromonomer, more preferably an aromatic group-containing monomer-based macromonomer, even more preferably a styrene macromonomer or a benzyl (meth)acrylate macromonomer, and further even more preferably a styrene macromonomer.

<9> The water-based ink according to any one of the aspects <1> to <8>, wherein the water-insoluble polymer (B) further includes a constitutional unit derived from a nonionic monomer (b-4).

<10> The water-based ink according to the aspect <9>, wherein the nonionic monomer (b-4) includes 2-hydroxyethyl (meth)acrylate, 3-hydroxypropyl (meth)acrylate, a polyalkylene glycol (meth)acrylate selected from the group consisting of polypropylene glycol (n=2 to 30 wherein n represents an average molar number of addition of oxyalkylene groups: hereinafter defined in the same way) (meth)acrylate and polyethylene glycol (n=2 to 30) (meth) acrylate, an alkoxy polyalkylene glycol (meth)acrylate selected from the group consisting of methoxy polyethylene glycol (n=1 to 30) (meth)acrylate, or phenoxy (ethylene glycol/propylene glycol copolymer) (n=1 to 30 in which n for ethylene glycol: 1 to 29) (meth)acrylate.

<11> The water-based ink according to the aspect <9> or <10>, wherein a content of the monomer component (b-1) in a monomer mixture containing the monomer components (b-1) to (b-4) upon production of the water-insoluble polymer (B) or a content of the constitutional unit derived from the monomer component (b-1) in the water-insoluble polymer (B) is preferably not less than 3% by mass, more preferably not less than 5% by mass and even more preferably not less than 7% by mass, and is also preferably not more than 40% by mass, more preferably not more than 30% by mass and even more preferably not more than 20% by mass.

<12> The water-based ink according to any one of the aspects <9> to <11>, wherein a content of the monomer component (b-2) in the monomer mixture containing the monomer components (b-1) to (b-4) upon production of the water-insoluble polymer (B) or a content of the constitutional unit derived from the monomer component (b-2) in the water-insoluble polymer (B) is preferably not less than 5% by mass, more preferably not less than 10% by mass and even more preferably not less than 20% by mass, and is also preferably not more than 86% by mass, more preferably not more than 70% by mass and even more preferably not more than 50% by mass.

<13> The water-based ink according to any one of the aspects <9> to <12>, wherein a content of the monomer component (b-3) in the monomer mixture containing the monomer components (b-1) to (b-4) upon production of the water-insoluble polymer (B) or a content of the constitutional unit derived from the monomer component (b-3) in the water-insoluble polymer (B) is preferably not less than 1% by mass, more preferably not less than 5% by mass and even more preferably not less than 7% by mass, and is also preferably not more than 25% by mass, more preferably not more than 20% by mass and even more preferably not more than 18% by mass.

<14> The water-based ink according to any one of the aspects <9> to <13>, wherein a content of the monomer component (b-4) in the monomer mixture containing the monomer components (b-1) to (b-4) upon production of the water-insoluble polymer (B) or a content of the constitutional unit derived from the monomer component (b-4) in the water-insoluble polymer (B) is preferably not less than 5% by mass, more preferably not less than 10% by mass and even more preferably not less than 20% by mass, and is also preferably not more than 60% by mass, more preferably not more than 55% by mass and even more preferably not more than 50% by mass.

<15> The water-based ink according to any one of the aspects <7> to <14>, wherein a mass ratio of the component (b-1) to a sum of the component (b-2) and the component (b-3) [component (b-1)/[component (b-2)+component (b-3)]] is preferably from 0.01 to 1, more preferably from 0.05 to 0.60 and even more preferably from 0.10 to 0.40.

<16> The water-based ink according to any one of the aspects <1> to <15>, wherein a weight-average molecular weight of the water-insoluble polymer (B) is preferably not less than 5,000, more preferably not less than 10,000 and even more preferably not less than 20,000, and is also preferably not more than 500,000, more preferably not more than 400,000, even more preferably not more than 300,000 and further even more preferably not more than 200,000.

<17> The water-based ink according to any one of the aspects <2> to <16>, wherein an average particle size of the water-insoluble polymer (B) particles containing the pigment (A) in the water-based ink is preferably not less than nm, more preferably not less than 60 nm and even more preferably not less than 75 nm, and is also preferably not more than 150 nm, more preferably not more than 120 nm and even more preferably not more than 110 nm.

<18> The water-based ink according to any one of the aspects <3> to <17>, wherein an average particle size of the water-insoluble polymer (B) particles containing no pigment in the water-based ink is preferably not less than 10 nm, more preferably not less than 30 nm and even more preferably not less than 50 nm, and is also preferably not more than 300 nm, more preferably not more than 150 nm and even more preferably not more than 100 nm.

<19> The water-based ink according to any one of the aspects <1> to <18>, wherein a boiling point of the organic solvent (c2) is preferably not lower than 170° C., more preferably not lower than 175° C., even more preferably not lower than 180° C., and further even more preferably not lower than 185° C.

<20> The water-based ink according to any one of the aspects <1> to <19>, wherein the organic solvent (c2) is preferably at least one compound selected from the group consisting of a compound represented by the following general formula (1) or (2), and a nitrogen-containing heterocyclic compound:

$$R^1\text{—O-(AO)}_n\text{—H} \tag{1}$$

wherein $R^1$ is a hydrogen atom, a methyl group or an ethyl group; AO is an alkyleneoxy group having 2 or 3 carbon atoms; n represents an average molar number of addition of AO and is a number of not less than 1 and not more than 10;

$$\tag{2}$$

wherein EO is an ethyleneoxy group; and m1, m2 and m3 respectively represent an average molar number of addition of EO with the proviso that a sum of m1, m2 and m3 (m1+m2+m3) is not less than 0 and not more than 10.

<21> The water-based ink according to the aspect <20>, wherein the compound represented by the general formula (1) is at least one compound selected from the group consisting of propylene glycol, dipropylene glycol, diethylene glycol, triethylene glycol, diethylene glycol monomethyl ether and diethylene glycol monoethyl ether.

<22> The water-based ink according to the aspect <20> or <21>, wherein the compound represented by the general formula (1) is glycerol or an ethyleneoxide adduct of glycerol (molar number of addition of EO: 1 to 10, preferably 1 to 8, more preferably 1 to 5 and even more preferably 1 to 4).

<23> The water-based ink according to any one of the aspects <1> to <22>, wherein a content of the pigment (A) in the water-based ink is preferably not less than 1.0% by mass, more preferably not less than 2.0% by mass and even more preferably not less than 2.5% by mass, and is also preferably not more than 15.0% by mass, more preferably not more than 10.0% by mass and even more preferably not more than 7.0% by mass.

<24> The water-based ink according to any one of the aspects <1> to <23>, wherein a content of the water-insoluble polymer (B) in the water-based ink is preferably not less than 0.5% by mass, more preferably not less than 0.8% by mass and even more preferably not less than 1.0% by mass, and is also preferably not more than 6.0% by mass, more preferably not more than 4.0% by mass and even more preferably not more than 3.0% by mass.

<25> The water-based ink according to any one of the aspects <1> to <24>, wherein a total content of the pigment (A) and the water-insoluble polymer (B) in the water-based ink is preferably not less than 1.5% by mass, more preferably not less than 2.3% by mass, even more preferably not less than 2.5% by mass, further even more preferably not less than 4.0% by mass and further even more preferably not less than 5.0% by mass, and is also preferably not more than 21.0% by mass, more preferably not more than 14.0% by mass, even more preferably not more than 10.0% by mass, further even more preferably not more than 9.0% by mass and further even more preferably not more than 8.0% by mass.

<26> The water-based ink according to any one of the aspects <1> to <25>, wherein a mass ratio of the water-insoluble polymer (B) to the pigment (A) [pigment (A)/water-insoluble polymer (B)] in the water-based ink is preferably not less than 100/300, more preferably not less than 100/200 and even more preferably not less than 100/150, and is also preferably not more than 100/25, more preferably not more than 100/50 and even more preferably not more than 100/70.

<27> The water-based ink according to any one of the aspects <2> to <26>, wherein a content of the pigment-containing polymer particles in the water-based ink is preferably not less than 1.0% by mass, more preferably not less than 3.0% by mass and even more preferably not less than 4.0% by mass, and is also preferably not more than 20.0% by mass, more preferably not more than 10.0% by mass and even more preferably not more than 8.0% by mass.

<28> The water-based ink according to any one of the aspects <1> to <27>, wherein a content of the organic solvent (C) in the water-based ink is preferably not less than 5.0% by mass, more preferably not less than 10.0% by mass, even more preferably not less than 16.0% by mass and further even more preferably not less than 18.0% by mass, and is also preferably not more than 70.0% by mass, more preferably not more than 60.0% by mass, even more preferably not more than 45.0% by mass and further even more preferably not more than 40.0% by mass.

<29> The water-based ink according to any one of the aspects <1> to <28>, wherein a content of the diethylene glycol isopropyl ether (c1) in the water-based ink is preferably not less than 1.0% by mass, more preferably not less than 3.0% by mass, even more preferably not less than 5.0% by mass and further even more preferably not less than 8.0% by mass, and is also preferably not more than 35.0% by mass, more preferably not more than 32.0% by mass, even more preferably not more than 28.0% by mass and further even more preferably not more than 20.0% by mass.

<29> The water-based ink according to any one of the aspects <1> to <28>, wherein a content of the organic solvent (c2) in the water-based ink is preferably not less than 1.0% by mass, more preferably not less than 2.0% by mass, even more preferably not less than 5.0% by mass, further even more preferably not less than 8.0% by mass and further even more preferably not less than 10.0% by mass, and is also preferably not more than 40.0% by mass, more preferably not more than 35.0% by mass, even more preferably not more than 30.0% by mass, further even more preferably not more than 25.0% by mass and further even more preferably not more than 20.0% by mass.

<30> The water-based ink according to any one of the aspects <1> to <29>, wherein a total content of the pigment (A), the water-insoluble polymer (B) and the diethylene glycol isopropyl ether (c1) in the water-based ink is not less than 5.0% by mass.

<31> The water-based ink according to any one of the aspects <1> to <30>, wherein a total content of the pigment (A), the water-insoluble polymer (B) and the diethylene glycol isopropyl ether (c1) in the water-based ink is preferably not less than 8.0% by mass, more preferably not less than 10.0% by mass, even more preferably not less than 12.0% by mass and further even more preferably not less than 14.0% by mass, and is also preferably not more than 45% by mass, more preferably not more than 42% by mass, even more preferably not more than 40% by mass and further even more preferably not more than 35% by mass.

<32> The water-based ink according to any one of the aspects <1> to <31>, wherein the value obtained by multiplying the total content (% by mass) of the pigment (A) and the water-insoluble polymer (B) in the water-based ink by the content (% by mass) of the diethylene glycol isopropyl ether (c1) in the water-based ink is preferably not less than 15, more preferably not less than 20, even more preferably not less than 30 and further even more preferably not less than 40, and is also preferably not more than 290, more preferably not more than 250, even more preferably not more than 200 and further even more preferably not more than 150.

<33> An image forming method including the steps of;
mounting a container filled with the water-based ink according to any one of the aspects <1> to <24> to an ink-jet printing apparatus equipped with an ink ejecting means; and
ejecting the ink onto a recording medium having a water absorption of not less than 0 g/m$^2$ and not more than 10 g/m$^2$ as measured by contacting with pure water for 100 ms to print characters or images thereon.

<34> The image forming method according to the aspect <33>, wherein the water absorption of the ink-jet recording medium as measured by contacting with pure water for 100 ms is preferably not less than 1.0 g/m$^2$, more preferably not less than 2.0 g/m$^2$, even more preferably not less than 3.0 g/m$^2$ and further even more preferably not less than 4.0 g/m$^2$, and is also preferably not more than 8.0 g/m$^2$, more preferably not more than 7.0 g/m$^2$, even more preferably not more than 6.0 g/m$^2$ and further even more preferably not more than 5.5 g/m$^2$.

<35> The image forming method according to the aspect <33> or <34>, wherein the ink ejecting means includes a thermal-type or piezoelectric-type ink-jet print head, preferably a piezoelectric-type ink-jet print head, for ejecting the ink therefrom.

<36> A use of the water-based ink according to any one of the aspects <1> to <32> for ink-jet printing.

EXAMPLES

In the following Production Examples, Examples and Comparative Examples, the "part(s)" and "%" indicate "part (s) by mass" and "% by mass", respectively, unless otherwise specified.

(1) Measurement of Weight-Average Molecular Weight of Polymer

The weight-average molecular weight of the polymer was measured by gel chromatographic method [GPC apparatus: "HLC-8120GPC" available from Tosoh Corporation; column: "TSK-GEL, α-M"×2 available from Tosoh Corporation; flow rate: 1 mL/min)] using N,N-dimethyl formamide in which phosphoric acid and lithium bromide were dissolved in amounts of 60 mmol/L and 50 mmol/L, respectively, as an eluent, and using a monodisperse polystyrene having a known molecular weight as a reference standard substance.

(2) Measurement of 1-Octanol/Water Partition Coefficient (i) In the Case of Diethylene Glycol Isopropyl Ether (c1)

The 1-octanol/water partition coefficient of the diethylene glycol isopropyl ether was measured by a shake flask method prescribed in JIS Z7260-107.

First, 10 g of ion-exchanged water and 10 g of 1-octanol were charged into a 50 mL separating funnel, and shaken at 25° C. to establish an equilibrium therebetween. Then, 1 g of diethylene glycol isopropyl ether was charged into the separating funnel, and the contents of the separating funnel were intimately shaken and subjected to centrifugal separation to separate the mixture into a 1-octanol phase and a water phase. The amounts of the diethylene glycol isopropyl ether dissolved in the respective phases were quantitatively determined by gas chromatography, thereby obtaining a partition coefficient of the diethylene glycol isopropyl ether between the two phases. The log P vale was determined as a common logarithm of the partition coefficient.

(ii) In the Case of the Other Solvents

The same measurement procedure as in the above item (i) was repeated except for using a solvent to be measured in place of the diethylene glycol isopropyl ether (c1), thereby obtaining a 1-octanol/water partition coefficient of the solvent.

(3) Measurement of Average Particle Sizes of Pigment-Containing Polymer Particles and Polymer Particles The particles were subjected to cumulant analysis using a laser particle analyzing system "ELS-8000" available from Otsuka Electrics Co., Ltd., to measure an average particle size thereof. The measurement was conducted under the conditions including a temperature of 25° C., an angle between incident light and detector of 90° and a cumulative number of 100 times, and a refractive index of water (1.333) was input to the analyzing system as a refractive index of the dispersing medium. Further, the measurement was conducted by adjusting a concentration of the dispersion to be measured to $5 \times 10^{-3}$% by mass in terms of the solid content thereof.

(4) Measurement of Solid Content of Pigment Water Dispersion

Sodium sulfate dried to constant weight in a desiccator was weighed in an amount of 10.0 g and charged in a 30 mL polypropylene vessel (φ: 40 mm; height: 30 mm), and about 1.0 g of a sample was added to the vessel. The contents of the vessel were mixed and then accurately weighed. The resulting mixture was maintained in the vessel at 105° C. for 2 h to remove volatile components therefrom and further allowed to stand in a desiccator for 15 min to measure a mass thereof. The mass of the sample after removing the volatile components therefrom was regarded as a mass of solids therein. The solid content of the sample was calculated by dividing the mass of the solids by the mass of the sample added.

(5) pH of Ink

The pH value of the ink at 25° C. was measured using a bench-top pH meter "F-71" available from Horiba Ltd., equipped with a pH electrode "6337-10D" available from Horiba Ltd.

(6) Viscosity of Ink

The viscosity of the ink was measured at 32° C. using an E-type viscometer "TV-25" (equipped with a standard cone rotor (1° 34'×R24); rotating speed: 50 rpm) available from Toki Sangyo Co., Ltd.

Production Example 1

Production of Water Dispersion of Pigment-Containing Polymer Particles (1) Synthesis of Water-Insoluble Polymer Forty six (46) parts of styrene available from Wako Pure Chemical Industries, Ltd., 14 parts of methacrylic acid available from Wako Pure Chemical Industries, Ltd., 30 parts of a styrene macromonomer "AS-6S" (molecular weight: 6,000; solid content: 50%) available from Toagosei Co., Ltd., and 50 parts of polypropylene glycol methacrylate "BLEMMER PP-1000" available from NOF Corporation were mixed to prepare 140 parts of a monomer mixture solution.

Eighteen (18) parts of methyl ethyl ketone and 0.03 part of 2-mercaptoethanol as a chain transfer agent as well as 10% (14 parts) of the monomer mixture solution prepared above were charged into a reaction vessel and mixed with each other, and then an inside atmosphere of the reaction vessel was fully replaced with a nitrogen gas.

Separately, a mixed solution prepared by mixing remaining 90% (126 parts) of the monomer mixture solution, 0.27 part of the above chain transfer agent, 42 parts of methyl ethyl ketone and 3 parts of 2,2'-azobis(2,4-dimethylvaleronitrile) "V-65" as a polymerization initiator available from Wako Pure Chemical Industries, Ltd., was charged into a dropping funnel. In a nitrogen atmosphere, the mixed solution in the reaction vessel was heated to 75° C. while stirring, and then the mixed solution in the dropping funnel was added dropwise thereinto over 3 h. After the elapse of 2 h from completion of the dropwise addition while maintaining the resulting mixed solution at a temperature of 75° C., a solution prepared by dissolving 3 parts of the above polymerization initiator in 5 parts of methyl ethyl ketone was added to the mixed solution, and the resulting reaction solution was further aged at 75° C. for 2 h and at 80° C. for 2 h to obtain a polymer solution (having a weight-average molecular weight of 100,000). The solid content of the thus obtained polymer solution was 60% by mass.

(2) Production of Water Dispersion of Pigment-Containing Polymer Particles

Forty four (44) parts of the polymer produced by drying the polymer solution obtained in the above (1) under reduced pressure were dissolved in 148 parts of methyl ethyl ketone. Added into the resulting solution were 12.5 parts of a 5N sodium hydroxide aqueous solution and 2 parts of a 25% ammonia aqueous solution both acting as a neutralizing agent. Further, 372 parts of ion-exchanged water and then 100 parts of a cyan pigment "PB-15:3" available from Dainichiseika Color & Chemicals Mfg. Co., Ltd., were added to the resulting mixed solution to prepare a pigment mixture solution. The degree of neutralization of the pigment mixture solution was 100 mol %. The thus obtained pigment mixture solution was mixed at 20° C. for 1 h using a disper blade at 7000 rpm. The resulting dispersion was dispersed under a pressure of 180 MPa using a Microfluidizer "High-Pressure Homogenizer M-140K" available from Microfluidics Corporation by passing the dispersion through the device 15 times.

The obtained dispersion of the water-insoluble polymer particles was held at 60° C. under reduced pressure to remove methyl ethyl ketone therefrom, followed by further removing a part of water therefrom. The resulting dispersion was subjected to centrifugal separation, and a liquid layer portion separated therefrom was filtered through a filter "Minisart Syringe Filter" (pore diameter: 5 μm; material: acetyl cellulose) available from Sartorius Inc., to remove coarse particles therefrom, thereby obtaining a water dispersion of pigment-containing polymer particles. The solid content of the water dispersion was 20% by mass, and the average particle size of the pigment-containing polymer particles was 100 nm.

Production Example 2

Production of Water Dispersion of Water-Insoluble Polymer Particles Containing No Pigment A 1000 mL separable flask was charged with 145 parts of methyl methacrylate available from Wako Pure Chemical Industries, Ltd., 50 parts of 2-ethylhexyl acrylate available from Wako Pure Chemical Industries, Ltd., 5 parts of methacrylic acid available from Wako Pure Chemical Industries, Ltd., 18.5 parts of "LATEMUL E118B" (active ingredient: 26%) available from Kao Corporation, 96 parts of ion-exchanged water and potassium persulfate available from Wako Pure Chemical Industries, Ltd., and the contents of the separable flask were stirred using a stirring blade (at 300 rpm), thereby obtaining a monomer emulsion.

A reaction vessel was charged with 4.6 parts of "LATEMUL E118B", 186 parts of ion-exchanged water and 0.08 part of potassium persulfate, and an inside atmosphere of the reaction vessel was fully replaced with a nitrogen gas. The contents of the reaction vessel were heated to 80° C. while stirring using a stirring blade (at 200 rpm) in a nitrogen atmosphere. Then, the aforementioned monomer emulsion was charged into a dropping funnel and added dropwise therefrom to the reaction vessel over 3 h to react with the contents of the reaction vessel. The resulting reaction solution was mixed with ion-exchanged water to adjust a concentration of the active ingredient therein to 20%, thereby obtaining a water dispersion of the water-insoluble polymer particles. The average particle size of the water-insoluble polymer particles was 100 nm.

Example 1 (Production of Water-Based Ink)

Ion-exchanged water was added to and mixed with a mixture including 21.5 parts of the water dispersion of the pigment-containing polymer particles (solid content: 20% by mass; pigment: 3.0 parts; water-insoluble polymer: 1.3 parts) obtained in Production Example 1, 9 parts of the water dispersion of the polymer particles (solid content: 20% by mass; water-insoluble polymer particles: 1.8 parts) obtained in Production Example 2, 10.0 parts of diethylene glycol isopropyl ether (DEGPE), 10.0 parts of propylene glycol, 5.0 parts of diethylene glycol and 0.5 part of acetylene glycol "SURFYNOL 104" (tradename) available from Air Products and Chemicals, Inc., to adjust a total volume of the resulting mixed solution to 100 parts. The thus obtained mixed solution was filtered through a filter "Minisart Syringe Filter" (pore diameter: 1.2 μm; material: acetyl cellulose) available from Sartorius Inc., to prepare a water-based ink having a pH value of 8.8. The results are shown in Table 1.

Examples 2 to 17 and Comparative Examples 1 to 5 (Production of Water-Based Inks)

The same procedure as in Example 1 was repeated except for using the respective compositions shown in Tables 1 and 2, thereby obtaining water-based inks.

The details of the pigments and the components (c2) shown in Tables 1 and 2 are as follows.

Pigment (PY-74): Yellow pigment "PY-74" available from Dainichiseika Color & Chemicals Mfg. Co., Ltd.
Pigment (PR-122): Magenta pigment "PR-122" available from Dainichiseika Color & Chemicals Mfg. Co., Ltd.
Pigment (PB-7): Carbon black pigment "PB-7" available from Cabot Corporation
Pigment (cab-o-jet-300); Self-dispersed carbon "cab-o-jet-300" available from Cabot Corporation
DEGME: Diethylene glycol monomethyl ether
DEGEE: Diethylene glycol monoethyl ether <Evaluation Test of Water-Based Ink>
(Preparation of Ink-Jet Printed Materials)

The water-based ink produced in the respective Examples and Comparative Examples was loaded to a printing evaluation apparatus available from Trytech Co., Ltd., equipped with an ink-jet print head "KJ4B-HD06MHG-STDV" available from Kyocera Corporation under the environmental conditions of a temperature of 25±1° C. and a relative humidity of 30±5%.

The operating conditions of the apparatus were set to a head voltage of 26 V, a frequency of 30 kHz, an ejected ink droplet amount of 12 pL, a head temperature of 32° C., a resolution of 600 dpi, a number of ink shots for flashing before ejection of 200 shots, and a negative pressure of −4.0 kPa.

The recording medium "OK Topcoat+" (glossy coated paper; A4 size; water absorption: 4.9 g/m$^2$) available from Oji Paper Co., Ltd., was fixed on a transporting table under reduced pressure such that a length direction of the recording medium was aligned with a transporting direction thereof.

A printing command was transmitted to the printing evaluation apparatus to print a solid image of Duty 100% (12 pL; 600×600 dpi) on the recording medium by an ink-jet printing method using the water-based ink, thereby obtaining printed materials. The thus obtained printed materials were subjected to the following evaluation test 1 to 4.

Experiment 1 (Evaluation of Ejection Stability)

After preparing the respective ink-jet printed materials, operation of the ink-jet printer used was stopped for 30 min, and a print head thereof was exposed to atmospheric air. After the elapse of 30 min from the stopping, the printing operation of the ink-jet printer was restarted to observe the condition of ejection of the ink upon preparing a first sheet of the printed material. The ejection recovery rate (%) was calculated according to the following formula to evaluate ejection stability of the ink.

Ejection Recovery Rate (%)=(Ejection Area of Solid Image Printing After Exposure to Atmospheric Air for 30 min)/(Ejection Area of Solid Image Printing Before Exposure Test)×100(%)

The larger the ejection recovery rate (%), the more excellent the ejection stability of the water-based ink becomes.

Experiment 2 (Quick-Drying Fixing Properties)

The printed material prepared above was rubbed with hands after the elapse of 10 s and 20 s from the preparation to examine quick-drying fixing properties thereof.
(Evaluation Ratings)
A: The printed solid image portion was free from peeling-off of a printed surface thereof even when contacting therewith after the elapse of 10 s.
B: The printed solid image portion was free from peeling-off of a printed surface thereof even when contacting therewith after the elapse of 20 s.
C: The printed solid image portion suffered from peeling-off of a printed surface thereof when contacting therewith after the elapse of 20 s.

Experiment 3

Evaluation of Image Uniformity

The printed solid image portion of the ink-jet printed material obtained in the above "Preparation of Ink-Jet Printed Materials" was observed by naked eyes to evaluate image uniformity thereof.

(Evaluation Ratings)

A: The printed solid image portion was free from white streaks or lines or color unevenness (liquid overflow).

B: The printed solid image portion slightly suffered from white streaks or lines.

C: The printed solid image portion remarkably suffered from white streaks or lines or color unevenness (liquid overflow).

Experiment 4 (Evaluation of Storage Stability)

The ink was filled in a closed container and stored in a thermostatic chamber at 70° C. for one week. The ink was measured for its viscosity at 32° C. before and after being stored by the above measuring method, and the storage stability of the ink was evaluated by the following index.

Storage Stability Index (%)=(Viscosity of Ink after Storage)/(Viscosity of Ink before Storage)×100 (%).

As the storage stability index (%) is closer to 100%, the ink is more excellent in storage stability. If the storage stability index lies within 120%, the ink can be practically used, and the storage stability index value of the ink preferably lies within 110%.

TABLE 1

| | | Examples | | | | | | | | | |
|---|---|---|---|---|---|---|---|---|---|---|---|
| | | 1 | 2 | 3 | 4 | 5 | 6 | 7 | 8 | 9 | 10 |
| Component (A) | Pigment (PB-15:3) | 3.0 | 3.0 | 3.0 | 3.0 | 3.0 | 3.0 | 3.0 | 3.0 | 3.0 | 3.0 |
| | Pigment (PY-74) | | | | | | | | | | |
| | Pigment (PR-122) | | | | | | | | | | |
| | Pigment (PB-7) | | | | | | | | | | |
| Component (B) | Polymer in pigment-containing polymer particles | 1.3 | 1.3 | 1.3 | 1.3 | 1.3 | 1.3 | 1.3 | 1.3 | 1.3 | 1.3 |
| | Polymer in water-insoluble polymer particles | 1.8 | 1.8 | 1.8 | 1.8 | | 1.8 | 1.8 | 1.8 | 1.8 | 1.8 |
| | Total content | 3.1 | 3.1 | 3.1 | 3.1 | 1.3 | 3.1 | 3.1 | 3.1 | 3.1 | 3.1 |
| Component (c1) | DEGPE (0.04)*1 | 10.0 | 10.0 | 10.0 | 3.0 | 10.0 | 10.0 | 10.0 | 10.0 | 10.0 | 10.0 |
| Component (c2) | Propylene glycol (−0.95) | 10.0 | 10.0 | 10.0 | 20.0 | 15.0 | 10.0 | 10.0 | 10.0 | 10.0 | 10.0 |
| | Diethylene glycol (−1.39) | 5.0 | 5.0 | 5.0 | 5.0 | 5.0 | | | | | |
| | Dipropylene glycol (−0.75) | | | | | | 5.0 | | | | |
| | Triethylene glycol (−1.45) | | | | | | | 5.0 | | | |
| | DEGME (−0.85) | | | | | | | | 5.0 | | |
| | DEGEE (−0.31) | | | | | | | | | 5.0 | |
| | Glycerol (≥−1.5) | | | | | | | | | | 5.0 |
| | Total content | 15.0 | 15.0 | 15.0 | 25.0 | 20.0 | 15.0 | 15.0 | 15.0 | 15.0 | 15.0 |
| Others | Acetylene glycol | 0.5 | 0.1 | 2.0 | 0.5 | 0.5 | 0.5 | 0.5 | 0.5 | 0.5 | 0.5 |
| | Ion-exchanged water*2 | balance | balance | balance | balance | balance | balance | balance | balance | balance | balance |
| | (A) + (B) | 6.1 | 6.1 | 6.1 | 6.1 | 4.3 | 6.1 | 6.1 | 6.1 | 6.1 | 6.1 |
| | [(A) + (B)] × (c1) | 61 | 61 | 61 | 18.3 | 43 | 61 | 61 | 61 | 61 | 61 |
| | (A) + (B) + (c1) | 16.1 | 16.1 | 16.1 | 9.1 | 14.3 | 16.1 | 16.1 | 16.1 | 16.1 | 16.1 |
| Evaluation results | Ejection stability (ejection recovery rate (%)) | 88 | 89 | 78 | 95 | 95 | 91 | 92 | 90 | 89 | 91 |
| | Quick-drying fixing properties | A | A | A | B | B | A | A | A | A | B |
| | Image uniformity | A | B | A | A | A | A | A | A | A | A |
| | Storage stability (storage stability index (%)) | 101 | 101 | 103 | 102 | 105 | 101 | 102 | 104 | 102 | 103 |

| | | Examples | | | | | | |
|---|---|---|---|---|---|---|---|---|
| | | 11 | 12 | 13 | 14 | 15 | 16 | 17 |
| Component (A) | Pigment (PB-15:3) | | | | | | | |
| | Pigment (PY-74) | 4.0 | | | | | | |
| | Pigment (PR-122) | | 5.0 | 5.0 | 5.0 | 5.0 | | |
| | Pigment (PB-7) | | | | | | 4.0 | 4.0 |
| Component (B) | Polymer in pigment-containing polymer particles | 1.7 | 2.1 | 2.1 | 2.1 | 2.1 | 1.7 | |
| | Polymer in water-insoluble polymer particles | 1.8 | 3.2 | 2.5 | 2.5 | 1.8 | 1.8 | 1.8 |
| | Total content | 3.5 | 5.3 | 4.6 | 4.6 | 3.9 | 3.5 | 1.8 |
| Component (c1) | DEGPE (0.04)*1 | 10.0 | 25.0 | 25.0 | 30.0 | 10.0 | 10.0 | 10.0 |
| Component (c2) | Propylene glycol (−0.95) | 10.0 | 1.0 | 5.0 | 1.0 | 10.0 | 10.0 | 15.0 |
| | Diethylene glycol (−1.39) | 5.0 | | | | 5.0 | 5.0 | 5.0 |
| | Dipropylene glycol (−0.75) | | | | | | | |
| | Triethylene glycol (−1.45) | | | | | | | |
| | DEGME (−0.85) | | | | | | | |
| | DEGEE (−0.31) | | | | | | | |
| | Glycerol (≥−1.5) | | | | | | | |
| Others | Total content | 15.0 | 1.0 | 5.0 | 1.0 | 15.0 | 15.0 | 20.0 |
| | Acetylene glycol | 0.5 | 0.5 | 0.5 | 0.5 | 0.5 | 0.5 | 0.5 |
| | Ion-exchanged water*2 | balance | balance | balance | balance | balance | balance | balance |

TABLE 1-continued

|  |  |  |  |  |  |  |  |  |
|---|---|---|---|---|---|---|---|---|
|  | (A) + (B) | 7.5 | 10.3 | 9.6 | 9.6 | 8.9 | 7.5 | 5.8 |
|  | [(A) + (B)] × (c1) | 75 | 258 | 240 | 288 | 89 | 75 | 58 |
|  | (A) + (B) + (c1) | 17.5 | 35.3 | 34.6 | 39.6 | 18.9 | 17.5 | 15.8 |
| Evaluation results | Ejection stability (ejection recovery rate (%)) | 91 | 75 | 78 | 76 | 89 | 91 | 84 |
|  | Quick-drying fixing properties | A | A | A | A | A | A | A |
|  | Image uniformity | A | B | B | B | A | A | A |
|  | Storage stability (storage stability index (%)) | 104 | 112 | 108 | 109 | 102 | 103 | 118 |

Note
*1 The respective values in parentheses with respect to the components (c1) and (c2) represent a 1-octanol/water partition coefficient.
*2 A remaining amount of ion-exchanged water on the basis of 100 parts by mass of whole components.

TABLE 2

|  |  | Comparative Examples |  |  |  |  |
|---|---|---|---|---|---|---|
|  |  | 1 | 2 | 3 | 4 | 5 |
| Component (A) | Pigment (PB-15:3) |  | 3.0 |  | 3.0 | 3.0 |
|  | Pigment (PB7) |  |  | 4.0 |  |  |
|  | Pigment (cab-o-jet-300) | 5.0 |  |  |  |  |
| Component (B) | Polymer in pigment-containing polymer particles |  | 1.3 | 1.7 | 1.3 | 1.3 |
|  | Polymer in water-insoluble polymer particles |  | 1.8 | 5.0 | 1.8 | 1.8 |
|  | Total content | 0.0 | 3.1 | 6.7 | 3.1 | 3.1 |
| Component (c1) | DEGPE (0.04)*1 | 10.0 | 1.0 | 30.0 | 30.0 |  |
| Component (c2) | Propylene glycol (−0.95) | 20.0 | 10.0 | 5.0 |  | 25.0 |
|  | Diethylene glycol (−1.39) | 5.0 | 5.0 |  |  | 5.0 |
|  | Total content | 25.0 | 15.0 | 5.0 | 0.0 | 30.0 |
| Others | Diethylene glycol monobutyl ether (0.7) |  |  |  | 5.0 |  |
|  | Acetylene glycol | 0.5 | 0.5 | 0.5 | 0.5 | 0.5 |
|  | Ion-exchanged water*2 | balance | balance | balance | balance | balance |
|  | (A) + (B) | 5.0 | 6.1 | 10.7 | 6.1 | 6.1 |
|  | [(A) + (B)] × (c1) | 50 | 6.1 | 321 | 183 | 0 |
|  | (A) + (B) + (c1) | 15.0 | 7.1 | 40.7 | 36.1 | 6.1 |
| Evaluation results | Ejection stability (ejection recovery rate (%)) | 76 | 89 | 32 | 71 | 92 |
|  | Quick-drying fixing properties | C | C | B | B | C |
|  | Image uniformity | B | C | C | B | C |
|  | Storage stability (storage stability index (%)) | 160 | 108 | 180 | 220 | 107 |

Note
*1 The respective values in parentheses with respect to the components (c1) and (c2) represent a 1-octanol/water partition coefficient.
*2 A remaining amount of ion-exchanged water on the basis of 100 parts by mass of whole components.

From Tables 1 and 2, it was confirmed that the water-based inks obtained in Examples were excellent in ejection stability and storage stability as well as quick-drying fixing properties and image uniformity when printed on a low-water absorbing recording medium as compared to the water-based inks obtained in Comparative Examples.

The invention claimed is:

1. A water-based ink for ink-jet printing, comprising water-insoluble polymer (B) particles comprising a pigment (A), an organic solvent (C) and water, in which the organic solvent (C) comprises diethylene glycol isopropyl ether (c1) and an organic solvent (c2) having a 1-octanol/water partition coefficient that is smaller than that of the diethylene glycol isopropyl ether (c1); a total content of the pigment (A), the water-insoluble polymer (B) and the diethylene glycol isopropyl ether (c1) in the water-based ink is not less than 5.0% by mass; a value obtained by multiplying a total content (% by mass) of the pigment (A) and the water-insoluble polymer (B) in the water-based ink by a content (% by mass) of the diethylene glycol isopropyl ether (c1) in the water-based ink is not less than 10 and not more than 300; and the organic solvent (c2) is at least one compound selected from the group consisting of a compound represented by the following general formula (1), and a nitrogen-containing heterocyclic compound:

$$R^1-O-(AO)_n-H \qquad (1)$$

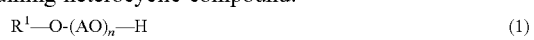

wherein $R^1$ is a hydrogen atom, a methyl group or an ethyl group; AO is an alkyleneoxy group having 2 or 3 carbon atoms; n represents an average molar number of addition of AO and is a number of not less than 1 and not more than 10.

2. The water-based ink for ink-jet printing according to claim 1, wherein the total content of the pigment (A) and the water-insoluble polymer (B) in the water-based ink is not less than 0.5% by mass and not more than 12.0% by mass.

3. The water-based ink for ink jet printing according to claim 1, wherein the content of the diethylene glycol isopropyl ether (c1) in the water-based ink is not less than 1.0% by mass and not more than 35.0% by mass.

4. The water-based ink for ink-jet printing according to claim 1, wherein a content of the organic solvent (c2) in the water-based ink is not less than 1.0% by mass and not more than 40.0% by mass.

5. The water-based ink for ink-jet printing according to claim 1, wherein the water-based ink comprises the water-insoluble polymer (B) particles comprising the pigment (A), the water-insoluble polymer (B) particles comprising no pigment, the organic solvent (C) and water.

6. The water-based ink for ink-jet printing according to claim 5, wherein an average particle size of the water-insoluble polymer (B) particles comprising no pigment in the water-based ink is not less than 10 nm and not more than 300 nm.

7. The water-based ink for ink-jet printing according to claim 1, wherein an average particle size of the water-insoluble polymer (B) particles comprising the pigment (A) in the water-based ink is not less than 40 nm and not more than 150 nm.

8. The water-based ink for ink-jet printing according to claim 1, wherein a boiling point of the organic solvent (c2) is not lower than 170° C.

9. The water-based ink for ink-jet printing according to claim 1, wherein a content of the pigment (A) in the water-based ink is not less than 1.0% by mass and not more than 15.0% by mass.

10. The water-based ink for ink-jet printing according to claim 1, wherein a content of the water-insoluble polymer (B) in the water-based ink is not less than 0.5% by mass and not more than 6.0% by mass.

11. The water-based ink for ink-jet printing according to claim 1, wherein a mass ratio of the water-insoluble polymer (B) to the pigment (A) [pigment (A)/water-insoluble polymer (B)] is not less than 100/300 and not more than 100/25.

12. The water-based ink for ink-jet printing according to claim 1, wherein a content of the organic solvent (C) in the water-based ink is not less than 5.0% by mass and not more than 70.0% by mass.

13. An image forming method comprising the steps of:
mounting a container filled with the water-based ink as claimed in claim 1 to an ink-jet printing apparatus equipped with an ink ejecting means; and
ejecting the ink onto a recording medium having a water absorption of not less than 0 g/m$^2$ and not more than 10 g/m$^2$ as measured by contacting with pure water for 100 ms to print characters or images thereon.

14. The water-based ink for ink-jet printing according to claim 1, wherein the compound represented by the general formula (1) is at least one compound selected from the group consisting of propylene glycol, dipropylene glycol, diethylene glycol, triethylene glycol, diethylene glycol monomethyl ether and diethylene glycol monoethyl ether.

15. The water-based ink for ink-jet printing according to claim 1, wherein the nitrogen-containing heterocyclic compound is 2-pyrrolidone.

16. The water-based ink for ink-jet printing according to claim 1, wherein a content of water in the water-based ink is not less than 20% by mass and not more than 70% by mass.

17. The water-based ink for ink jet printing according to claim 1, wherein the water-insoluble polymer (B) is a vinyl-based polymer containing a constitutional unit derived from an ionic monomer (b-1) and a constitutional unit derived from a hydrophobic monomer (b-2).

18. The water-based ink for ink-jet printing according to claim 1, wherein a content of the water-insoluble polymer (B) particles comprising the pigment (A) in the water-based ink is not less than 1.0% by mass and not more than 20.0% by mass.

19. The water-based ink for ink-jet printing according to claim 1, wherein a total content of the pigment (A), the water-insoluble polymer (B) and the diethylene glycol isopropyl ether (c1) in the water-based ink is not more than 45% by mass.

* * * * *